| United States Patent [19] | [11] | 4,243,849 |
|---|---|---|
| Goshima et al. | [45] | Jan. 6, 1981 |

[54] SIGNAL RECORDING DEVICE

[75] Inventors: Takeshi Goshima, Tokyo; Hideaki Sato, Yokohama; Takao Tsuji, Kawasaki, all of Japan

[73] Assignee: Canon Kabushiki Kaisha, Tokyo, Japan

[21] Appl. No.: 36,512

[22] Filed: May 7, 1979

Related U.S. Application Data

[63] Continuation of Ser. No. 837,912, Sep. 29, 1977, abandoned, which is a continuation of Ser. No. 576,268, May 12, 1975, abandoned.

[30] Foreign Application Priority Data

| May 15, 1974 [JP] | Japan | 49-54167 |
|---|---|---|
| Sep. 20, 1974 [JP] | Japan | 49-108576 |

[51] Int. Cl.³ .................. H04N 5/76; G11B 11/12
[52] U.S. Cl. ................... 369/62; 358/128.5; 369/13; 369/124; 369/130
[58] Field of Search ............ 358/128.5, 127, 129, 358/130, 132; 179/100.1 G, 100.3 V, 100.3 N, 100.3 F, 100.3 D, 100.3 M, 100.3 A, 100.41 L, 100.4 D, 100.4 L, 100.4 M, 100.4 R, 100.1 B; 346/151; 365/126

[56] References Cited

U.S. PATENT DOCUMENTS

| 3,202,769 | 8/1965 | Coleman | 179/100.1 R |
|---|---|---|---|
| 3,737,589 | 6/1973 | Redlich | 179/100.4 C |
| 3,772,467 | 11/1973 | Ohwaki | 179/100.4 ST |
| 3,800,100 | 3/1974 | Runge | 179/100.4 L |
| 3,829,605 | 8/1974 | Dickopp | 179/100.41 P |
| 3,894,179 | 7/1975 | Jacobs | 179/100.3 V |

OTHER PUBLICATIONS

Radio Amateur's Handbook, ©1971, pp. 160-162.

Primary Examiner—Bernard Konick
Assistant Examiner—Alan Faber
Attorney, Agent, or Firm—Fitzpatrick, Cella, Harper & Scinto

[57] ABSTRACT

A signal recording device comprises information means for introducing frequency-modulated information signals, generator means for generating control signals corresponding to the frequencies of the information signals introduced by the information means, control means for varying the level of signals applied thereto in accordance with the output of the generator means, input means for applying the information signals to the control means, modulator means for applying, as modulation signals, the level-varied information signals provided by the control means, and beam generating means for generating a beam the intensity of which is to be varied by the modulator means.

6 Claims, 91 Drawing Figures

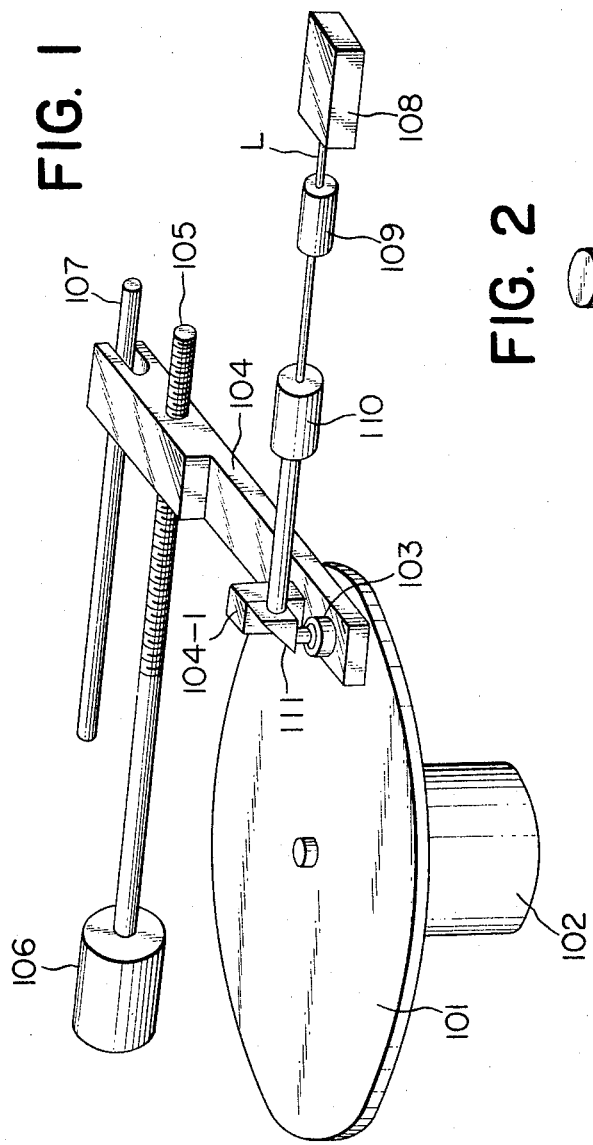

FIG. 9
(a) 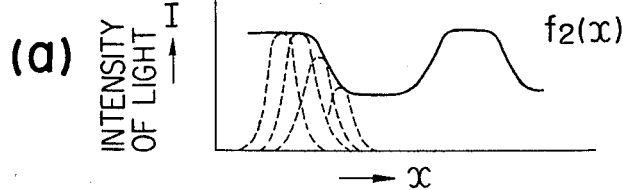
(b) 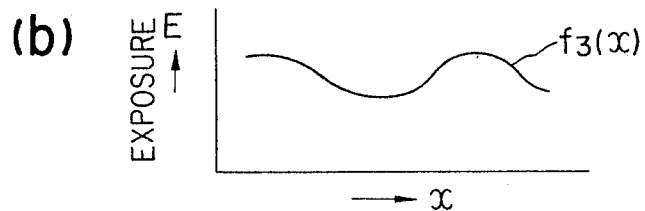
FIG. 10
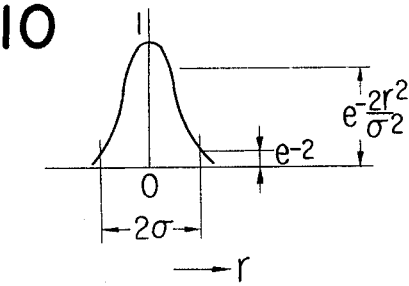
FIG. 11
(a) 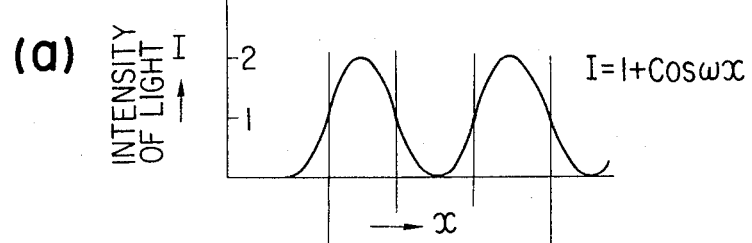
(b) 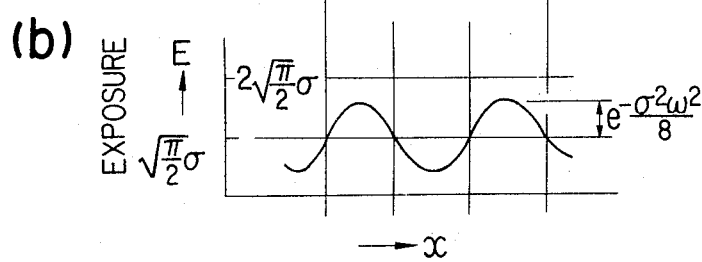

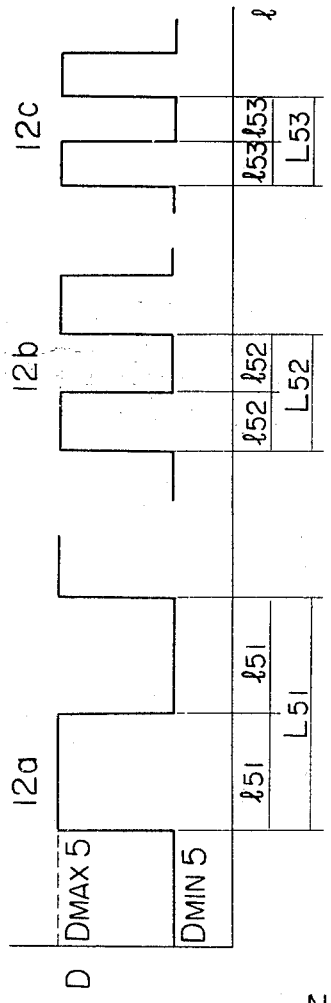
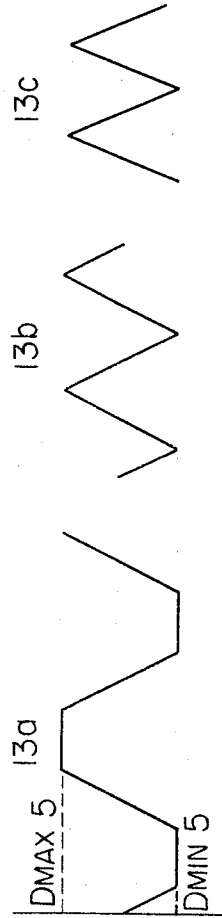
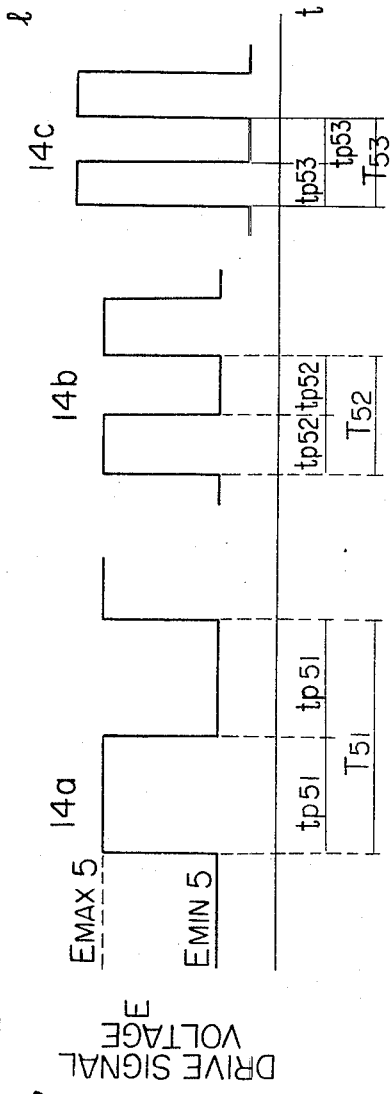

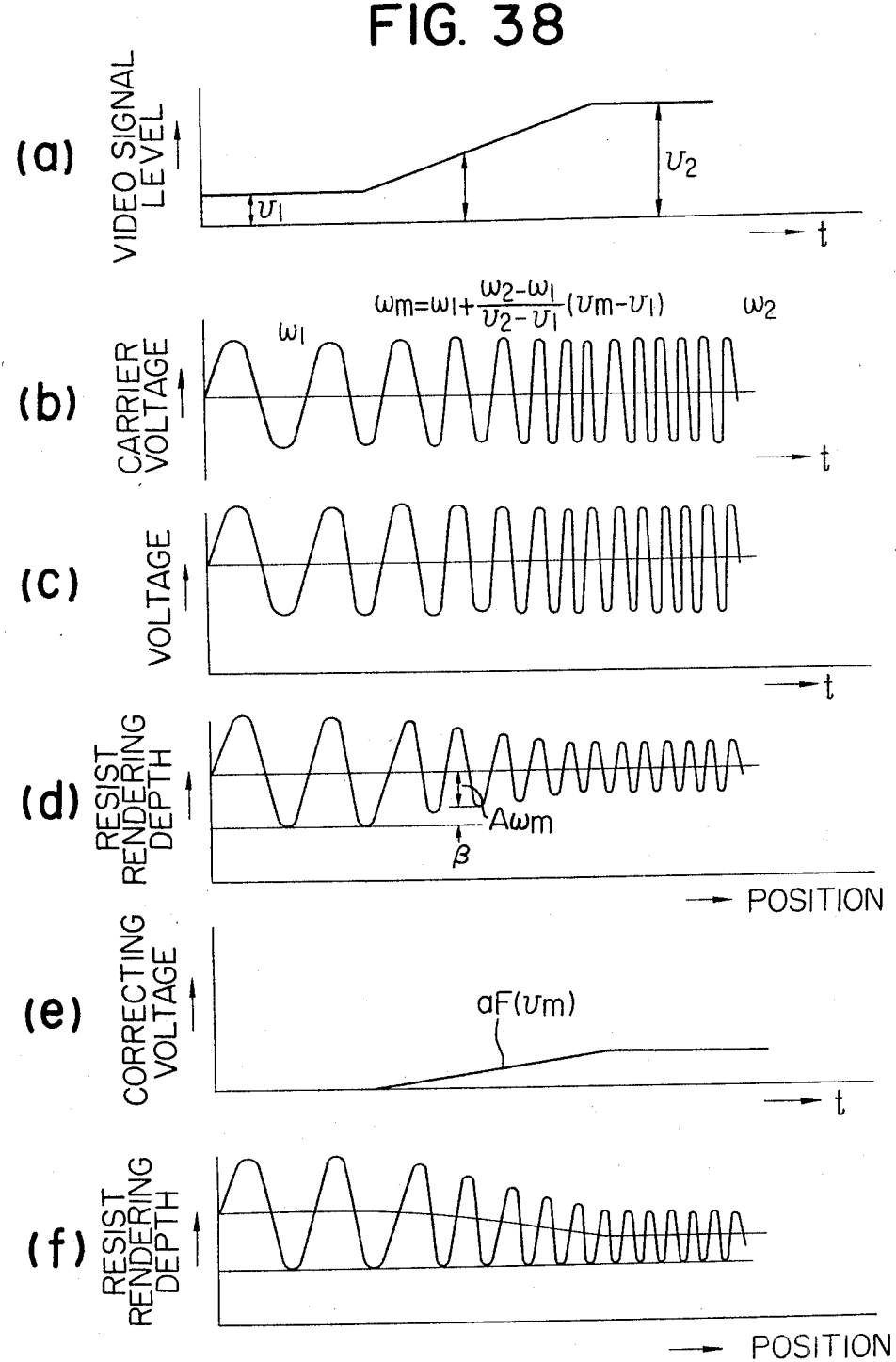

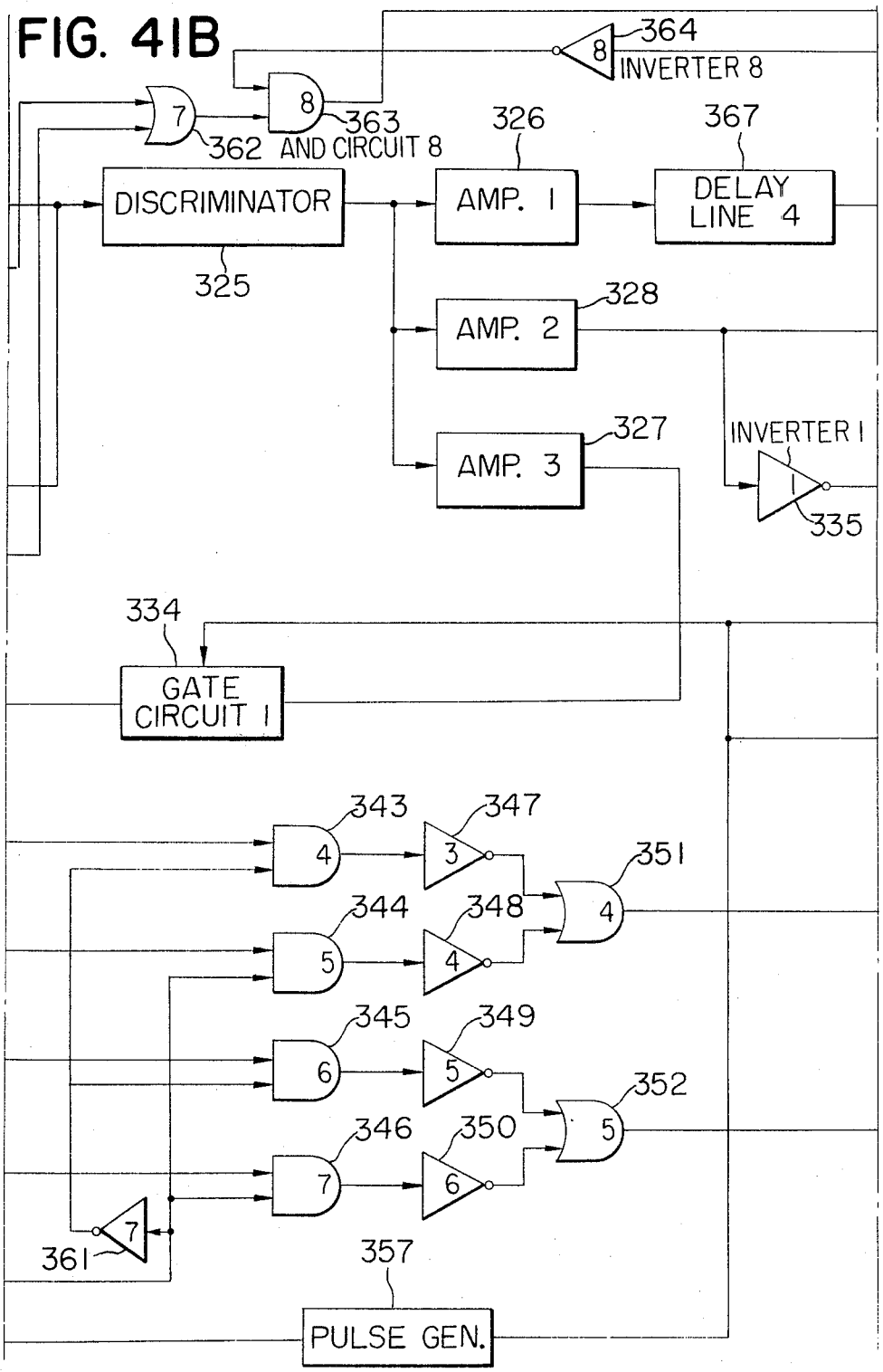

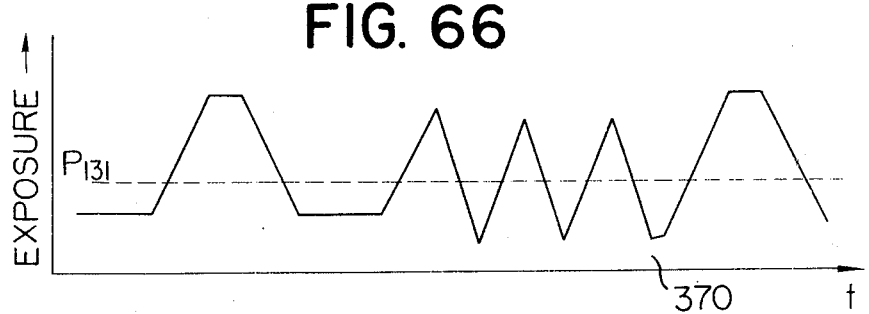
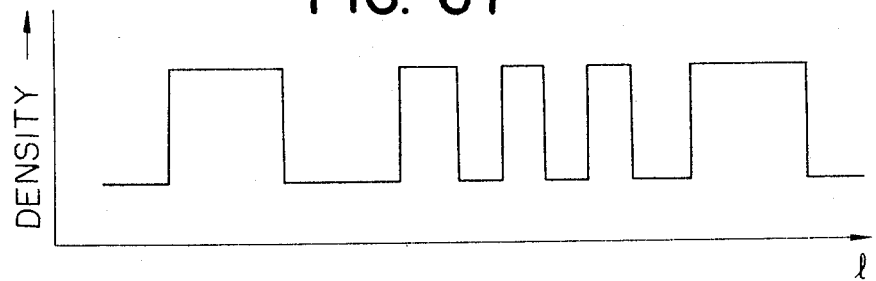
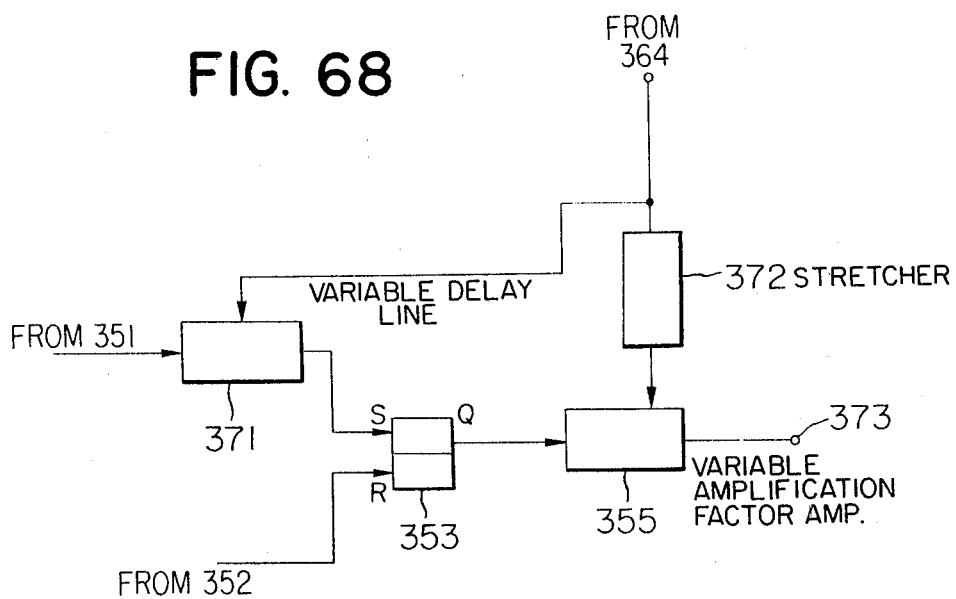

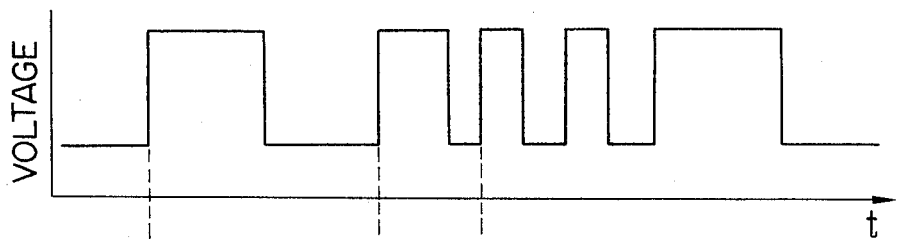
FIG. 69
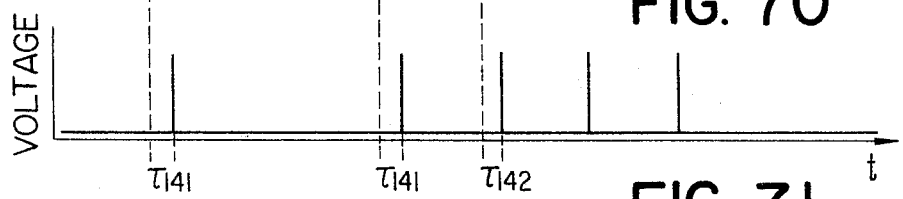
FIG. 70
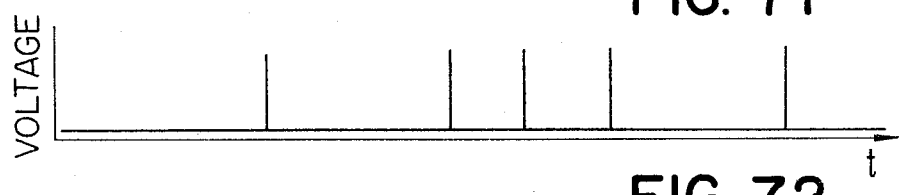
FIG. 71
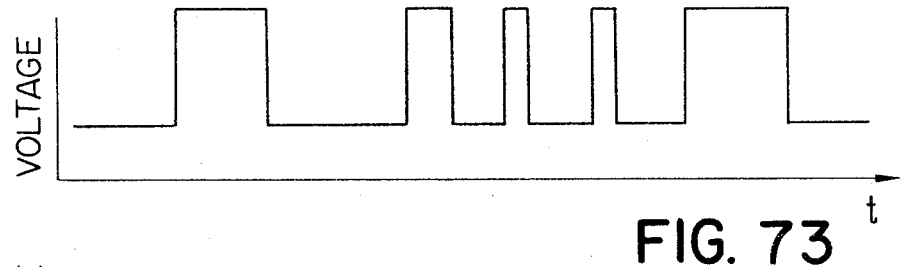
FIG. 72
FIG. 73
FIG. 74
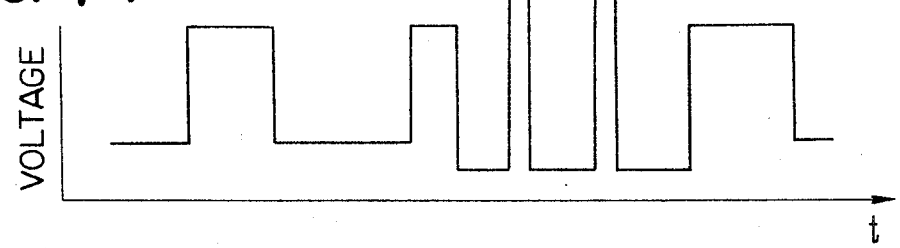

SIGNAL RECORDING DEVICE

This is a continuation, of application Ser. No. 837,912 filed Sept. 29, 1977, now abandoned, which in turn is a continuation of Ser. No. 576,268 filed May 12, 1975, now abandoned.

BACKGROUND OF THE INVENTION

1. Field of the Invention

This invention relates to a signal recording device in which signals such as TV signals are frequency- or pulse-frequency-modulated and, after such modulated signals are applied as modulation signals to a modulator, a beam is applied to the modulator to cause the modulator to provide a recording beam having signal components, such beam being applied to a recording medium to thereby record signals on the recording medium

2. Description of the Prior Art

It has commonly been practised to record information on a recording medium by applying to the recording medium a beam modulated by the information. However, although a drive signal voltage applied to a light intensity modulator for varying the intensity of beam energy in accordance with signals is proportionate to the intensity of the modulated beam energy, and although the intensity of the modulated beam energy may be sufficiently responsive to variations with time of the drive signal voltage, the amplitude with which the record pattern is recorded on the recording medium cannot be maintained constant because of the non-uniform energy distribution throughout the beam applied to the recording medium, and because of the limited diameter of the beam. Thus, reproduction of the signals from such recording medium does not result in exact reproduction of the information which is to be recorded.

SUMMARY OF THE INVENTION

It is thrrefore an object of the present invention to provide a signal recording device for preparing a recording medium which enables information to be reproduced more exactly.

It is another object of the present invention to provide a signal recording device for reducing, in the recording of information on a recording medium by use of a beam, error signals which will be generated by the recording medium, when played back, due to non-uniform energy distribution in the beam.

It is still another object of the present invention to provide a signal recording device for reducing, in the recording of information on a recording medium by using a beam, error signals which will be generated by the recording medium, when played back, due to the limited diameter of the beam.

It is yet still another object of the present invention to provide a signal recording device for reducing error signals which will be generated by the recording medium, when played back, in accordance with the frequencies of information signals.

Other objects and features of the present invention will become more fully apparent from the following detailed description taken in conjunction with the accompanying drawings.

BRIEF DESCRIPTION OF THE DRAWINGS

FIG. 1 is a perspective view of a recording device for recording information on a thin film of photoresist by using a laser beam.

FIG. 2 is an enlarged, perspective view of a portion of FIG. 1.

FIGS. 9(a) and (b) and FIG. 10 illustrate the intensity, the exposure and the energy distribution of light.

FIGS. 11(a) and (b) illustrate the intensity of light and the exposure.

FIG. 25 illustrates an ideal record density of the recording medium.

FIG. 26 is an illustration of a realizable record pattern on the recording medium.

FIG. 27 illustrates the drive signal voltage waveform for providing the record pattern shown in FIG. 26.

FIGS. 30, 32 and 33 show density waveforms on the recording medium.

FIGS. 38(a) to (f) are illustrations for explaining the recording medium shown in FIG. 37.

FIGS. 61–67 illustrate the desirable record signals in the case of FIG. 2, FIG. 61 showing the density waveform on the recording medium, FIG. 62 showing the exposure waveform, FIG. 63 showing the density waveform on the recording medium, FIG. 64 showing the drive signal voltage waveform subjected to the first correction, FIG. 65 showing the drive signal voltage waveform subjected to the first and the second correction, FIG. 66 showing the exposure waveform, and FIG. 67 showing the density waveform.

FIG. 68 is a block diagram of the signal recording system for providing the second correction.

FIGS. 69–74 show signal waveforms at various portions shown in FIG. 68.

DESCRIPTION OF THE PREFERRED EMBODIMENTS

Figure 3:
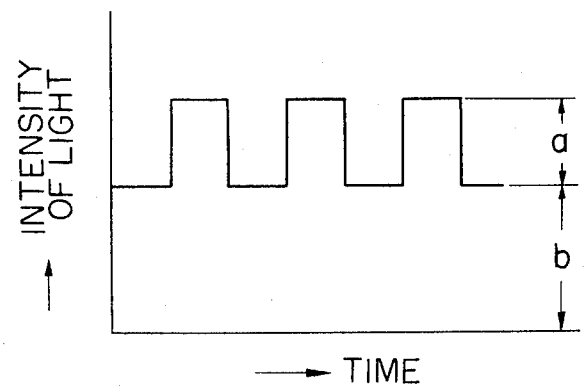
FIG. 3 illustrates variation with time in intensity of light.

Before specific constructions of the present invention are described, a basic construction and theory of the present invention will first be discussed in order to make clearer the features of the invention.

There has already been proposed means whereby concavo-convex waveforms frequency-modulated or pulse-frequency-modulated by video signals are recorded on a disc of plastics to depict a spiral locus and, when the disc is rotated with the concavo-convexities contacted by a stylus with a suitable pressure, the vibrations sensed by the stylus are converted into electrical signals as by ceramic piezo element and such signals are demodulated to reproduce the video signals.

The bands of video signals used in the ordinary television must be of the order of at least 3 MHz and frequency modulation of such signals requires the carrier frequency to be within the range of about 4 to 6 MHz.

This frequency range is as high as two to three hundred times the upper limit of usual audio frequency which is 20 KHz.

Generally, in the case of audio record, a master disc which is commonly called the lacquer disc is subjected to cutting on the basis of real time, namely, at the same speed as the speed required for play back of the record. This is because the record cutter can be driven relatively easily by the use of the present-day technique even if the audio frequency is of the order as high as or twice 20 KHz. On the other hand, in the case of a video signal, if the cutting were to be effected on a real time basis, the cutter would have to be driven at 4 to 6 MHz as mentioned above, and this would be almost impossible with present-day techniques even if the cutting depth required were one micron or less.

A potent means for forming concavo-convexities of the abovementioned high frequency on a real time basis would be to record on a thin film of photoresist by utilization of a laser beam.

FIG. 1 shows an example of means for forming concavo-convex waveforms on a thin film of photoresist by utilization of a laser beam. Numeral 101 designates a glass disc having its surface coated with positive photoresist or photo-soluble resist as thick as several microns, which disc may be rotatively driven by a disc driving motor 102. A condensing optical system 103 is disposed in proximity to the disc 101 and supported by a holder 104. The holder 104 is movable by a feed screw 105, which is rotatable by a feed motor 106, to thereby move the condensing optical system radially of the disc. A guide bar 107 is provided to prevent the holder 104 from rotating about the axis of the screw 105.

The feed motor 106 and the disc driving motor 102 may respectively be rotated by an unshown drive circuit, at a number of revolutions per minute which are correlated, so that the radial pitch of the spiral which is the locus of signals recorded may assume a desired value.

Light L from a laser 108 passes through a modulator 109 and further through an optical system 110 for enlarging the diameter of the light beam, and enters the condensing optical system via a mirror 111 supported by a projected portion 104-1 of the holder. Having entered the condensing optical system, the light is formed into a rectilinearly distributed light beam 114 by a cylindrical lens 112 and a condenser lens 113, as shown in FIG. 2. If the photoresist on the rotating disc is exposed to the rectilinearly distributed light 114 with the lengthwise direction thereof substantially aligned with the radial direction of the disc, and with the intensity of the light varied with time as shown in FIG. 3, and thereafter the resist is developed, then the portion of the photoresist exposed to the light will be dissolved to form tracks having wave-like concavo-convexities which correspond to the variation with time in the light at the bottom of the spiral grooves having a gutter-like cross-sectional configuration, as shown in FIG. 4.

Figure 5:
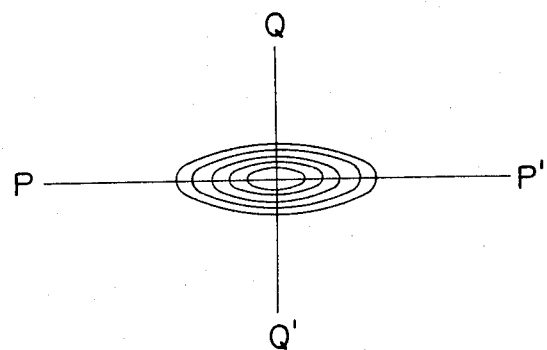
FIG. 5 is a view illustrating the beam energy distribution on the recording medium.

The reason why the grooves formed in the photoresist 115 take such gutter-like shape is that the distribution on the resist surface of the energy of the rectilinearly distributed light 114 shown in FIG. 2 assumes a mountain-shaped light distribution represented by an isoenergic distribution with a peak value at the center, as is shown in FIG. 5.

The connection between FIGS. 3 and 4 will now be described briefly. In FIG. 4, the shaded portions represent the portions subjected to an exposure corresponding to the intensity of light a+b in FIG. 3, and in these portions the rendering of the photoresist is deepest, while the other portions between these shaded portions are the portions subjected to an exposure corresponding approximately to the intensity of light b. In FIG. 4, reference numeral 116 designates a cross-section of the grooves taken along the center of the record locus, and the wave-like concavo-convexities appearing in the cross-section correspond to the variations in intensity of light shown in FIG. 3.

Figure 4:
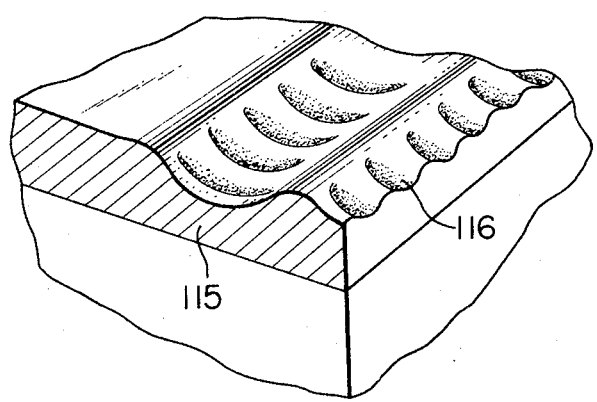
FIG. 4 is a fragmentary, perspective view showing the signal locus formed on the recording medium.

The variation with time in intensity of light as shown in FIG. 3 may be achieved by the light modulator 109 being driven by unshown electric circuit.

In the foregoing, the fact that a laser beam passed through a suitable light modulator and a condensing optical system enables the concavo-convexities of gutter-shaped waveforms as shown in FIG. 4 for imparting vibrations to a stylus to be formed in the stylus guide and in the bottom of the guide grooves has been described with respect to a very simple case where the intensity of light is varied with time.

With the signals thus recorded a record can be manufactured through a process substantially similar to that required in making an ordinary audio record from a lacquer disc, namely, by applying a silver mirror to the photoresist having concavo-convexities recorded thereon, plating the same with nickel to provide a mold, and using such mold to transfer the configuration of the photoresist onto the surface of a disc of polyvinyl chloride or similar material. The product so obtained is a video record, and an example of the reproduce means for such record will be shown below.

Figure 6:
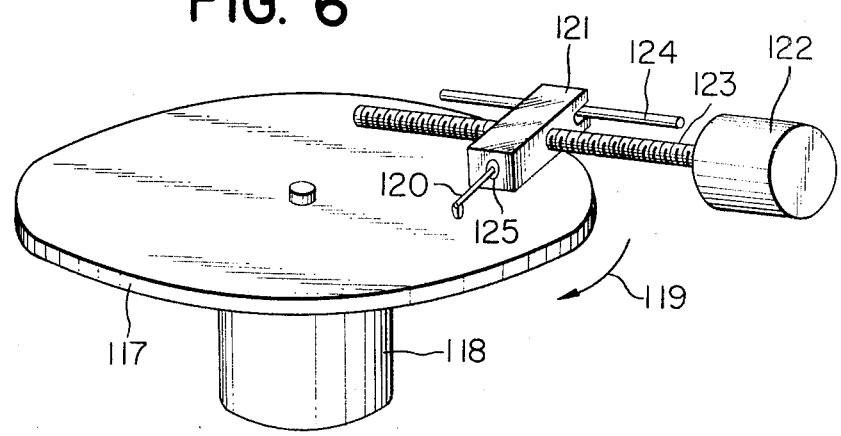
FIG. 6 is a perspective view of a reproduce device for reproducing the information on the recording medium.

Referring to FIG. 6, reference numeral 117 designates a video disc which may be rotated by a motor 118 which is driven at a predetermined speed and in the direction of arrow 119 by an unshown power source.

A pickup assembly for tracing the grooves having signals recorded thereon to pickup the signals is designated by 120, and is coupled to and supported by a holder 121 with rubber or similar elastic material 125 interposed therebetween.

The holder 121 is engaged by a screw 123, connected to a holder feed motor 122, to move the pickup 120 radially of the record, and also engaged by a guide bar 124 which restrains the holder from rotating about the screw 123.

The holder feed motor is rotated by an unshown rotative driving circuit in a manner related with the rotation of the motor 118 so that for one complete rotation of the record, the holder is moved by a distance corresponding to one radial pitch of the grooves in which signals are recorded.

Figure 7A:
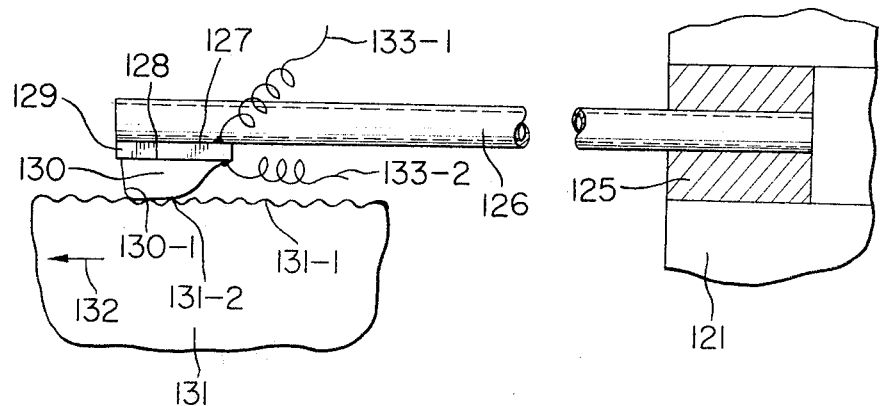
FIGS. 7(a) and 7(b) are a side view and an enlarged perspective view, respectively. for illustrating the pickup of the reproduce device shown in FIG. 6.

Details of the pickup assembly 120 are shown in FIG. 7(a). There is a pipe 126 formed of a light material such as, for example, titanium, and a piezo element 129 having long and short sides of the order of several hundred microns and as thick as several tens of microns has one surface adhesively secured to the pipe 126 at one end thereof, electrodes 127 and 128 being provided on the opposite surfaces of the element. A stylus 130 formed of, for example, diamond is adhesively secured to the other surface of the piezo element 129.

The other end of the pipe 126 is coupled to the holder 121 by an elastic material 125 such as rubber or the like.

Figure 7B:
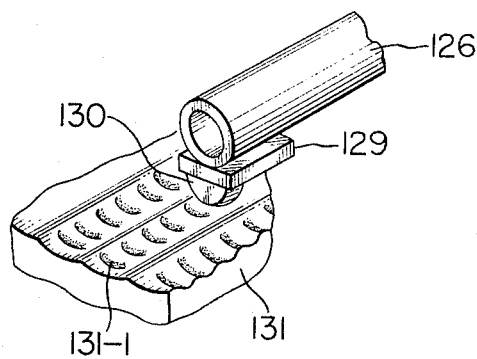

FIG. 7(b) illustrates the manner in which the stylus 130 engages the record 131. Reference numeral 131-1 designates the wave-like concavo-convexities which are signals provided on the surface of the record. If, in FIG. 7(a), the record is moved in the direction of arrow 132, a portion 131-2 of the record which has so far been compressed by the stylus 130 will abruptly be liberated to thereby produce a sudden pressure variation in the stylus 130.

This stylus variation will be transmitted to the piezo element 129 and derived as an electrical signal through lead wires 133-1 and 133-2 led out from the electrodes of the element.

Such signal detection system is remarkably different from the conventional audio record. In the audio record, the stylus is attached to the end of a cantilever such as a titanium pipe or the like so that the entire cantilever is moved in accordance with the concavo-convexities of the record grooves, and movement of the stylus is detected by a magnetic responsive member provided near the base of the cantilever. In some cases, movement of the stylus is detected as an electromotive force from movement of a moving coil connected to the cantilever adjacent the stylus. Thus, in the conventional audio pickup, the stylus itself is arranged to follow the recorded concavo-concavities substantially faithfully.

In contrast, in the video record signal detection now under discussion, the stylus holding system comprising the cantilever pipe 126 and elastic material 125 shown in FIG. 7(a) is not designed to move following the individual waveforms of the recorded concavo-convexities 131-1, but is designed to follow any up-and-down movement of the record surface accompanying the rotation of the record which may be attributable to incompleteness of the record manufacturing process or to the record holding means in a record play-back device, or to follow any vibration of the spiral grooves on the record in the radial direction thereof, thereby ensuring that the stylus 130 engages the grooves on the record and bears against the bottom thereof with the most uniform pressure possible.

In audio record, as already described, the frequency of the modulation signal may be as high as several megahertz and, therefore, it is hardly possible to vibrate the cantilever itself at such frequency and, if the record is made sufficiently flat and rotated while being supported sufficiently flatly, the cantilever pipe 126 will effect no up-and-down movement and the convex portion of the wave-like concavo-convexities on the record surface will be compressed by the stylus 130 and liberated from its compressed condition at the moment the stylus leaves the portion 130-1. With such phenomenon recurring, the repetition period of the wave-like concavo-convexities may be derived as main information from terminals 133-1 and 133-2.

If the detecting means as shown in FIG. 7(a) were realized, the amplitude with which the cantilever pipe 126 can follow the up-and-down movement of the record surface would be of such a nature that it is greatly decreased with increase in frequency of the up-and-down movement of the record surface and, assuming that the record surface has fine undulations and that the record surface effects up-and-down movement at several tens of kilohertz with rotation of the record, then the amplitude with which the cantilever pipe 126 can follow such up-and-down movement will be several microns at greatest.

While the reproduce means for a video record has generally been described above, the following problems will be encountered when playing back the wave-like concavo-convexities recorded by the use of the laser beam as previously mentioned.

Figure 8:
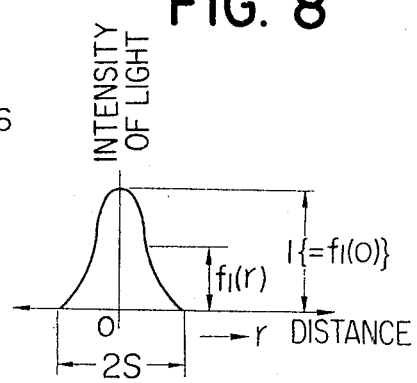
FIG. 8 illustrates the beam energy distribution.

The foregoing discussion made in conjunction with FIGS. 3, 4 and 5 has not taken into account the influence which the distribution in the direction Q-Q' of the rectilinearly distributed light shown in FIG. 5 imparts to the formation of the cross-section of the wave-like concavo-convexities of the record groove bottoms, taken in the direction of movement of the stylus, whereas the actual situations are as follows:

The condition of distribution of the rectilinearly distributed light shown in FIG. 5 is dependent on the distribution of the light as it enters the condensing optical system, the numerical aperture of the condensing optical system, the focal length of the cylindrical lens and the aberration in the condensing optical system, but the distribution thereof in the direction Q-Q' will often take such a configuration as generally shown in FIG. 8. The intensity of the light itself is determined by the intensity of the light as it enters the optical system, but distribution is independent of intensity and may be expressed in a normalized manner. Thus, let the intensity at the center be one unit, and distribution may sufficiently be expressed by the intensity at a position distant by r from the center.

Nevertheless, in the ensuing description, the cross-section Q-Q' will only be considered.

In the example shown in FIG. 8, distribution takes a configuration similar to an error function and symmetrical with r=O, and it is to be understood that this is expressed as a function f1(r).

Now, if a light beam having the diameter f1(r) travels at equal velocity laterally from end to end, in the drawing, in such a relationship that the relation between the intensity I at the center and the position x is expressed as f2(x), as shown in FIG. 9(a), then the exposure at the point x may be expressed as:

$$\int_{-\infty}^{+\infty} f2(x + r) \cdot f1(r) dr = f3(x) \tag{1}$$

This is represented in FIG. 9(b).

In the event that the variation in intensity of light with position is like a trigonometric function, the exposures at succesive positions during the travel of the rectilinearly distributed light may easily be known in a manner which will be described below.

If a light having the intensity distribution as shown in FIG. 10 travels at equal velocity from $x = -\infty$ to $x = \infty$ with its center intensity presenting a variation corresponding to the positions as shown in FIG. 11(a), the exposure E at each point along x will be a function of x and of a value $\omega$ which represents the period of variation in intensity of light with respect to x, and may be expressed as:

$$E(x,\omega) \int_{-\infty}^{+\infty} [1 + \cos \omega(x + r)] \cdot e^{-\frac{2r^2}{\sigma^2 dr}} \tag{2}$$

The result of integration of equation (2) will be:

$$E(x, \omega) \text{ to } \sqrt{\frac{x}{2}} \cdot \sigma(1 + e^{-\frac{\sigma^2 \omega^2}{8}} \cos \omega x) \tag{3}$$

As will be seen from FIG. 11(b) and equation (3) above, increase of $\omega$ decreases the variation in exposure. This means that, for example, when wave-like concavo-convexities are to be recorded on photoresist, the record wavelength becomes shorter and the amplitude of the concavo-convexities recorded is correspondingly decreased.

Figure 12:
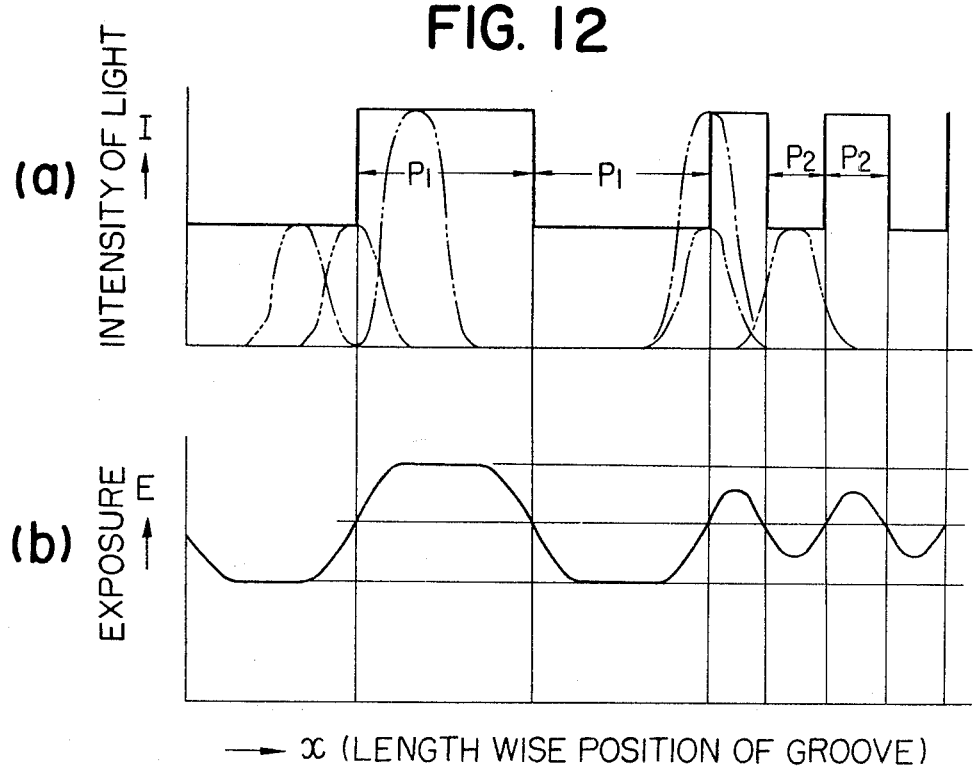
FIGS. 12(a) and (b) are for illustrating the exposure on the recording medium.

FIG. 12 shows an example of the distribution which occurs during actual recording of video signals. When intensity modulation is effected on a light beam with respect to the record groove position x as shown in FIG. 12(a), namely, when the rectilinearly distributed light travels at equal velocity laterally in the drawing so that the center of the rectilinearly distributed light comes to each position along x while the intensity of light in the marginal portion thereof assumes the values as indicated by the chain line, then the exposure at each position along x, i.e. the integral value of the light beam received by each position will be such as shown in FIG. 12(b).

That is, in the portion P1, where the period of variation in intensity of light is greater than the width 2S of the light beam in FIG. 8, saturation appears in the exposure depending on the position along x, whereas in the portion P2 the width between the maximum and the minimum value of the exposure is smaller than in the portion P1. Also, the minimum value in the portion P2 is greater than that in the portion P1 and the maximum value in the portion P2 is smaller than that in the portion P1.

Figure 13:
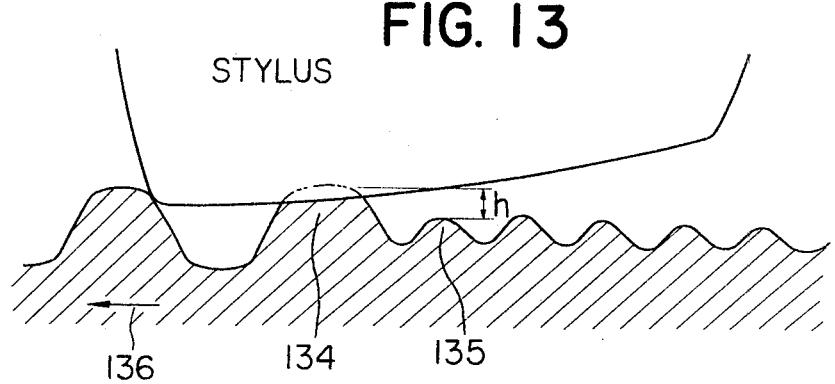
FIGS. 13 and 14 illustrate the signal locus formed on the recording medium.

If such exposure is effected on photoresist in the portion thereof where the ratio of exposure to rendering amount is rectilinear, namely, in the area of the photoresist where it is rendered in proportion to exposure, then the wave-like concavo-convex configuration of the record will be such as shown in FIG. 13, wherein the peaks of the shorter wavelength portion of the wave-like concavo-convexities on the record is lower in height than those of the longer wavelength portion.

Therefore, if the record is moved in the direction of arrow 136, the stylus must be displaced downwardly by a height h in FIG. 13 within a time shorter than the time required for the record to move over the distance from the convexity 134 to the concavity 135, in order that the position of contact of the stylus may shift to the concavity 135. Such rapid displacement cannot be realized due to the limitations in the mass and other factors of the stylus and cantilever pipe as previously mentioned, and thus the stylus will glide over the convexity 135 without making contact therewith. At what position the stylus will again contact the record is dependent on the vertical compliance of the stylus. Should the stylus glide in this manner, a faithful modulation signal may not be detected from the concavo-convex portion and so-called drop-out will occur to the video signals.

Figure 14:
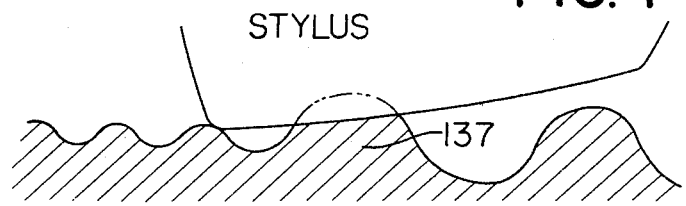

FIG. 14 shows a case in which, conversely to FIG. 13, the short wavelength portion is followed by the long wavelength portion. In such case, the convex portions 137 are subjected to very great pressure which will cause permanent deformation of the convex portions or extensive wear of the stylus.

An object of the present invention is to provide means for eliminating the variation in height of the peaks of the recorded waveform which are caused by different wavelengths when modulated video signals are recorded by the use of a laser. More specifically, to record wave-like concavo-convexities in the stylus guide grooves and in the bottom of such grooves, a correcting signal for decreasing the minimum value of the variation in quantity of light in the portion wherein the period of the modulated video signal is shorter than in the portion wherein the period is long is applied to a light modulator, to thereby equalize the heights of the peaks of the convexities in the short-wavelength portion with those of the convexities in the long-wavelength portion.

Figure 15:
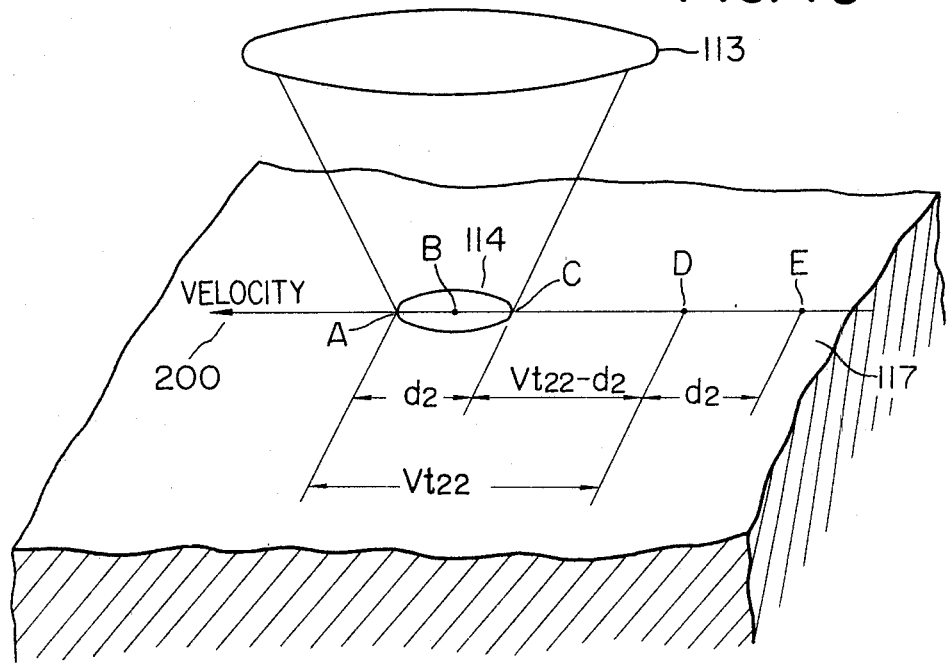
FIG. 15 is an enlarged, perspective view of essential portions of FIG. 1.

The foregoing description has been made with respect to the case where the energy distribution of a light beam is not uniform and information is recorded with concavo-convexities on a recording medium, and further description will hereinafter be made of a phenomenon which results from the limited diameter of the light beam. For the purpose of better understanding, it is assumed in the ensuing description that the energy of the light beam is uniform in every portion and that the recording medium is formed of silver salt film. In the ensuing description, it is also assumed that the drive signal voltage applied to the light modulator 109 is similar to the electrical signal obtained when the intensity of the light-modulated laser beam is photoelectrically converted by a photoelectric converter such as a photoelectron multiplier tube. In such assumption, the relationship between the drive signal voltage Ein and the intensity Iout of the laser beam in a light modulator utilizing the electro-optical effect in a known manner is expressed as Iout$\alpha$Sin$^2$Ein, and since correction of such non-linearity would be accomplished as by pre-correcting the drive signal voltage or by correcting the same through negative feed back by the use of an electrical signal resulting from photoelectric conversion of the modulated laser beam, it is clear that the foregoing assumption is not inappropriate to explain the purport of the present invention. FIG. 15 is an enlarged perspective view of the essential portion of FIG. 1, and shows the manner in which the recording medium 117 is exposed to light.

Figure 17:
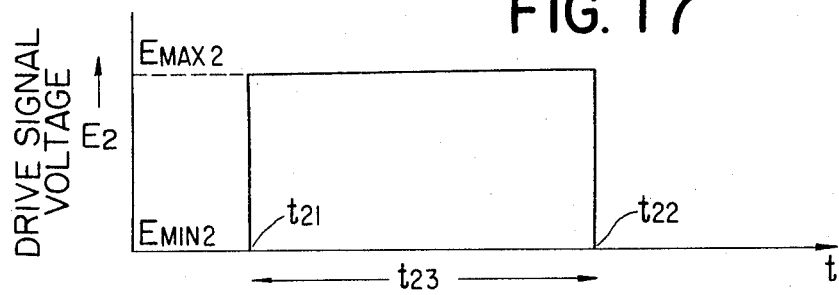
FIG. 17 illustrates a drive signal voltage applied to the modulator.

In FIG. 15, the point indicated as rectilinearly distributed light 114 in FIG. 2 is enlargedly depicted and for simplicity of description, it is assumed that the radiation illumination of light within such rectilinearly distributed light spot 114 is uniform, being Io. Now, at time $t_{21}$, the position of the light spot 114 on the recording medium 117 is assumed to be such that the center of the light spot is B and the points whereat the line 200 passing through the center B and indicating the direction of movement intersects the circumference of the light spot 114 are A and C, respectively, as shown in FIG. 15 (the diameter of the light spot is assumed as $d_2$.) Let v be the velocity of movement of the recording medium and $\tau_{21}$ be the time required for the recording medium to move over a distance equal to the diameter $d_2$ of the light spot 114. It is also assumed that at time $t_{21}$, the drive signal voltage $E_2$ reaches Emax2 so as to permit the laser beam to pass through the light modulator 109(see FIG. 17), the consideration will be given to a case where the time $t_{23}$ of the duration of Emax2, namely, exposure time $t_{23}$, is in the relation that $t_{23} > \tau_{21}$. The exposure P imparted onto the recording medium is generally expressed as the product of the radiation illumination Io and the exposure time t, that is P=Io·t.

Therefore, at any point to the left of the point A, Io=0 and hence, P=0, and at the point C, t=$\tau_{21}$ and so, P=$\tau_{21}$ Io, while at point B, t=$\tau_{21}/2$ and therefore, P=$\tau_{21}/2$ Io. That is to say, the exposure at each point on the segment AC is given by the product of the time and Io from the time $t_{21}$ when each point undergoes exposure until the light spot 113 has passed through that point. That is shown in FIG. 16.

Figure 16:
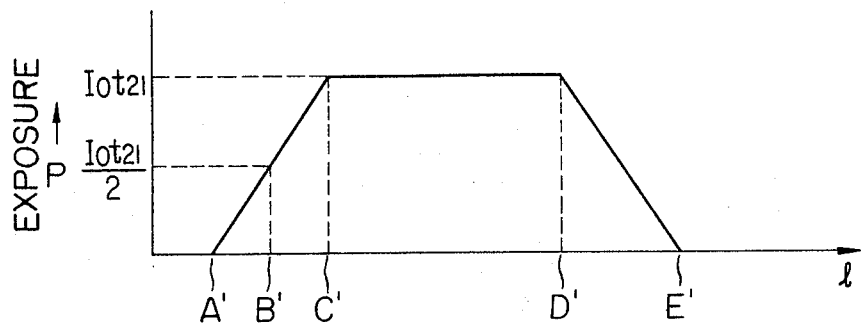
FIG. 16 illustrates the exposures at various points on the recording medium.

In FIG. 16, the abscissa is identical with an extension of the segment $\overline{AC}$ and represents the length thereof, and various points A', B', C' and so on designate the positions corresponding to A, B, C and so on in FIG. 15.

Assuming that after lapse of time $t_{23}$ and at time $t_{22}$, the drive signal voltage attains Emin2 and the laser beam is intercepted by the light modulator 109 to discontinue the exposure, the point D on the recording medium 117 has come to the same position as the position whereat the point A on the recording medium lay at time $t_{21}$, and the point E at a distance $d_2$ from the point D lies at the same positions as the position whereat the point C lay at time $t_{21}$. Obviously, the exposure at various points existing between the points D and E follows the same course as that followed by the various points between A and C and thus, as shown in FIG. 16, the variation in exposure between D' and E' is symmetrical with that between A' and C'.

For the various segments, these relations are established: $\overline{AC}=d_2=A'C'$; $\overline{CD}=Vt_{22}-d_2$; $\overline{DE}=d_2=D'E'$; $\overline{AD}=Vt_{22}=A'D'$; and $A'E'=Vt_{23}+d_2$.

In the foregoing, it should be noted that even if initiation or termination of the exposure takes place infinitely rapidly, the light spot has a certain exposure at that time and therefore, forwardly and rearwardly of the recording medium in its direction of movement with respect to the center of the light spot, there are portions in which the exposure is being varied by $(d_2/2)$.

FIGS. 18 to 21 show the conditions of a recording effected by using a drive signal voltage comprising a continuous pulse train having a constant repetition period. In the ensuing description, it is assumed that recording takes place in the area of the recording medium or silver salt film wherein the record density D thereof is linearly proportionate to exposure which is the product of the radiation illumination of the light spot and the exposure time.

Figure 18:
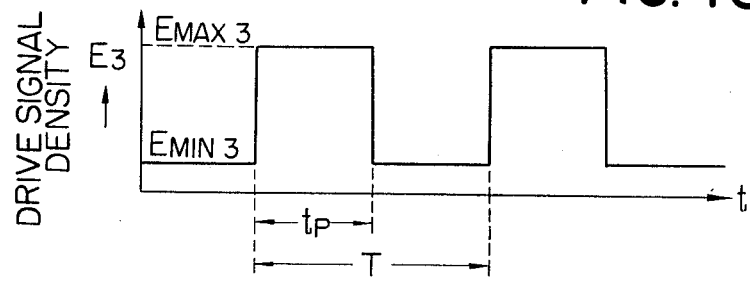
FIG. 18 is an illustration of a drive signal voltage applied to the modulator.

FIG. 18 illustrates the variation with time in the drive signal voltage $E_3$ applied to the light modulator, and it is assumed there that repetition period is T, that the time tp during which the light is projected comprises a symmetrical wave, and that the maximum and the minimum values of the drive signal are Emax3 and Emin3, respectively.

Figure 19:
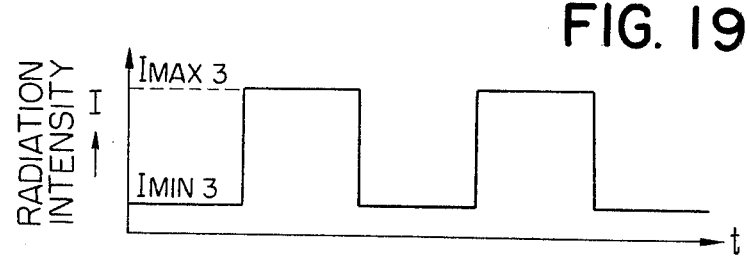
FIG. 19 illustrates the beam radiation intensity.
Figure 20:
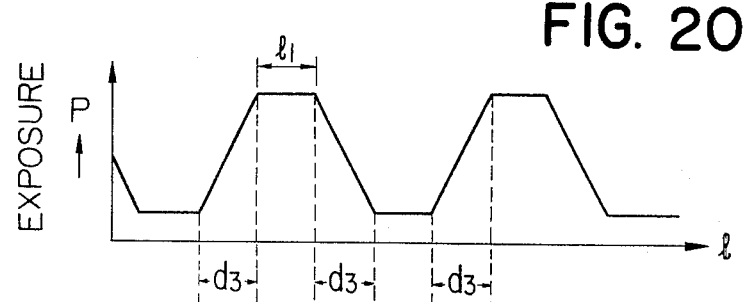
FIG. 20 is an illustration of the exposure at various points on the recording medium.
Figure 21:
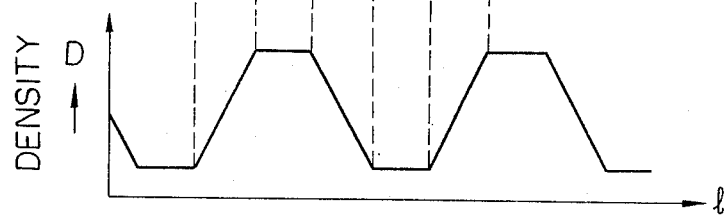
FIG. 21 illustrates the record density of the recording medium.

FIG. 19 illustrates the variation with time in the radiation intensity of the laser beam passed and modulated through the light modulator. Since, as already mentioned, it is assumed that the drive signal voltage is proportionate to the radiation intensity of the laser beam after modulation, the radiation intensity is represented by Imax3 for Emax3 and by Imin3 for Emin3. FIG. 20 shows the exposure imparted to the recording medium by the aforesaid laser beam and the abscissa thereof which corresponds to the abscissas of FIGS. 18 and 19, i.e. time, is represented as distance 1 which is in the relation that 1=vt. In this FIGURE, let $l_1$ be the distance which permits an exposure corresponding to its maximum valve to be imparted to the recording medium, and v be the velocity of movement of the recording medium. Then, such distance may be given by $l_1=vtp-d_3$, where $d_3$ is the diameter of the light spot. Further, from the foregoing assumption on the exposure and density, it follows that the variation with distance in the density recorded on the recording medium is similar to FIG. 20, as seen in FIG. 21.

Figures 22, 23, 24:
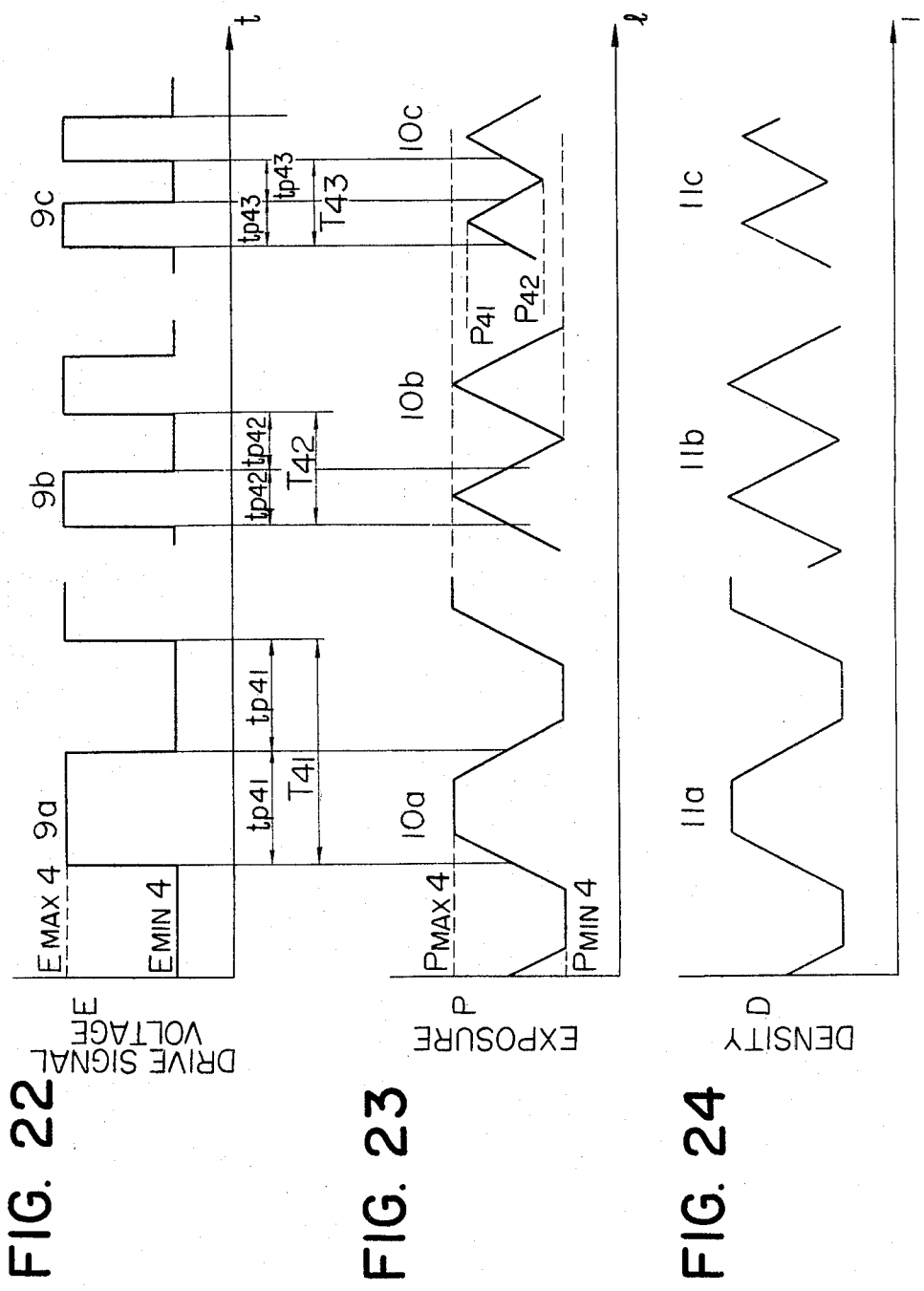
FIG. 22 illustrates a drive signal applied to the modulator.
FIG. 23 illustrates the exposure on the recording medium.
FIG. 24 illustrates the record density of the recording medium.

With reference to FIGS. 22-24, description will now be made of the cases where the pulse width tp varies, such as $tp_{41}$, $tp_{42}$ and $tp_{43}$ (all these are symmetrical rectangular waves having periods $T_{41}$, $T_{42}$ and $T_{43}$, respectively, and $T_{41}>T_{42}>T_{43}$). The relations between the abscissas in FIGS. 22, 23 and 24 are similar to those in FIGS 18-21, and the drive signal voltage is similar to the radiation intensity of light, and therefore the radiation intensity is not shown in particular. In FIG. 22, reference characters 9a, 9b and 9c respectively designate the cases where $tp_{41}>(d_3/v)$, $tp_{42}=(d_3/v)$ and $tp_{43}>(d_3/v)$. In the case of 9a, as will be apparent also from the explanation of FIGS. 18–21, the exposure is varied as indicated at 10a in FIG. 23 and the resultant density variation on the recording medium is such as shown at 11a in FIG. 24. Next, in the case where $tp_{42}=(d_3/v)$, the flat portion of the exposure disappears as indicated at 10b in FIG. 23 but the maximum value of the exposure in Pmax4 which is identical with 10a of FIG. 23 and apparently, the resultant density variation on the recording medium is such as indicated at 11b in FIG. 24. In this case where $tp_{43} > d_3/c$, the rising and falling of the exposure are determined primarily by the movement velocity v of the recording medium, the diameter $d_3$ of the light spot and the variation in exposure (Pmax4−Pmin4) and thus, as indicated at 10c in FIG. 23, during the time when the drive signal voltage corresponds to Emax4, the exposure is affected by the falling point of the time corresponding to the next drive signal voltage Emin4 before Pmax4 is reached, and the exposure is likewise affected by the rising point of the time corresponding to the next drive signal voltage Emax4 before Pmin4 is reached and after all, the exposure is decreased as compared with the cases of 10a and 10b in FIG. 23. In this case, the density variation on the recording medium is such as indicated at 11c in FIG. 24, wherein it is seen that no recording densities corresponding to Pmax4 and Pmin4 may be provided.

In the foregoing, description has been made of cases wherein the drive signal voltage is predetermined, but the point of view will not be changed to consider what drive signal voltage should be applied to provide a constant variation in recording density on the recording medium irrespective of any variation in the repetition period of pulse. FIG. 25 shows an ideal record pattern of density variation when the recorded wavelength on the recording medium, namely, the distance corresponding to the sum of the distance over which the density is high and the distance over which the density is low is $L_{51}$, $L_{52}$ or $L_{53}$, and the distance over which the density is high is equal to the distance over which the density is low (although it is assumed that $L_{51} > L_{52} > L_{53}$). However, even if the rising and falling of the drive signal voltage is infinitely rapid, it is impossible to obtain the record pattern as shown in FIG. 25 inasmuch as the diameter of the light spot is limited. FIG. 26 shows an example of the case where, when the diameter of the light spot is equal to $l_{52}$ indicated at 12b, the maximum and the minimum value of the density which may be provided in a realizable record pattern should be substantially constant irrespective of the recorded wavelength. At 13c in FIG. 26, as described in connection with FIGS 22-24, the variation in density with time exhibits sharp gradients due to the limited diameter of the light spot and the required constancy of of the density, and when $l_{53} = \frac{2}{3} l_{52}$, the gradient may be 1.5 times that indicated at 13b, whereby there may be provided a record pattern having a density between Dmax 5 and Dmin5. Since FIG. 26 corresponds to the variation with time in exposure, FIG. 27 shows the variation with time in the necessary drive signal voltage to impart such exposure. In FIG. 27, designations 14a and 14b respectively correspond to 9a and 9b in FIG. 22. Further, in FIG. 27, the relation thereof with FIG. 25 is held by $l_{53} = vtp_{53}$, and this also holds true with $tp_{52}$ and $tp_{51}$.

At 14c, the drive signal voltage is increased to provide a sharper variation or gradient with time in exposure than at 14a and 14b. More specifically, at 14c, assuming that $T_{52} = (3/2)T_{53}$ ($tp_{52} = (3/2)tp_{53}$), the gradient at 13c is (3/2) times that at 13a or 13b (because the gradient at 13c equals $$\frac{Pmax5 - Pmin5}{tp_{53}} = \frac{3(Pmax5 - Pmin5)}{2tp_{52}},$$

and it will accordingly be apparent that (3/2) (Emax5−Emin5) is required for the drive signal voltage E.

It will thus be found that provision of a constant record density on the recording medium irrespective of the period of the drive signal voltage may be accomplished by correcting the drive signal voltage in a manner related with the repetition period thereof.

The foregoing description has been made with respect to the steady state condition, namely, the case where the period of the drive signal voltage is variable, and there has not been taken into consideration the variation with time in period, i.e. the transient condition.

The purport of the present invention resides in achievement of said condition, of course, but it also resides in the provision of the correcting means for forming a desirable record pattern on the recording medium when the period of the drive signal voltage is variable with time, namely, during transient conditions, as will further be described. The invention will hereinafter be described in greater detail with reference to FIGS. 28 to 31.

Figure 28:
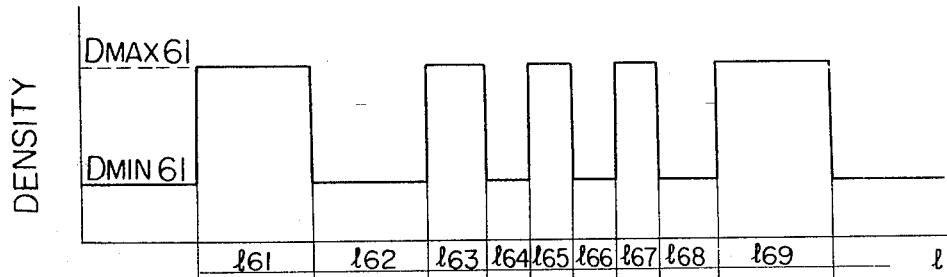
FIG. 28 shows the pattern density waveform on the recording medium.

Referring to FIG. 28, it shows a "desirable record pattern" provided on the recording medium by using any desired recording wavelength. The words "desirable record pattern" mean that the record density is varied while holding a maximum value Dmax61 and a minimum value Dmin61 for any period of the drive signal voltage, namely, for any length of record, and that the density variation at the end portion shifting from Dmin61 to Dmax61 or vice versa is infinitely steep.

Figure 29:
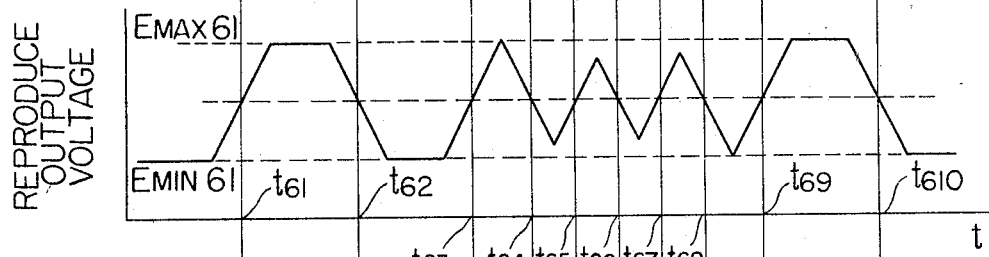
FIGS. 29 and 30 illustrate the reproduce output voltage waveforms provided by the recording medium.

FIG. 29 graphically illustrates the reproduce output voltage obtained from the photoelectric converter when the record pattern supposed to be as shown in FIG. 28 is scanned by a reproduce light spot having a limited aperture and a uniform radiation illumination to photoelectrically convert the density variation. (The abscissa t is the time axis related with the scanning velocity Vs and 1-Vst during play-back and, if Vs is considered equal to the movement velocity V of the recording medium in FIGS. 18—21, the time axes in FIGS. 18, 19, 22, 27 and 29 are all equal.) In FIG. 29, it is assumed that the reproduce output voltage has been corrected so as to be linear with respect to density, and points of time $t_{61}$, $t_{62}$, ... $t_{610}$ are in accord with the points of time whereat the center of the reproduce light spot has passed the successive positions on the recording medium which have the above created density variation, the diameter of the reproduce light spot being shown as equal to the record length $l_{63}$ on the recording medium.

For the portions in FIG. 28 having great density and having record lengths $l_{61}$, $l_{62}$ and $l_{69}$, the reproduce output voltage has flat portions Emax or Emin as indicated in FIG. 29. Also, the reproduce output voltage corresponding to the record length $l_{63}$ or $l_{68}$ has no flat portion but has peaks Emax61 or Emin61.

However, it is seen that the reproduce output voltage corresponding to $l_{64}$, $l_{65}$, $l_{66}$, $l_{67}$ is decreased in amplitude without reaching Emax61 or Emin61, as will also be inferred from 9c, 10c and 11c in FIGS. 22, 23 and 24.

On the other hand, in case of the record pattern as shown in FIG. 28, for example, in case such pattern corresponds to an FM modulation signal known in the field of VTR or the like, the modulation signal, i.e. original information has been converted into frequency variation and from this, it may be inferred that on the recording medium record lengths $l_{61}$, $l_{62}$ ... $l_{69}$ are related with the original information and thus, in FIG. 29, the original information is related with the reproduce output voltage at each of the points of time $t_{61}$ to $t_{610}$ which correspond to the positions of density variation in FIG. 28.

Also, in the NR21 system or the PE system which is used to record digital data on magnetic tape or on a magnetic cassette recorder, the digital data, i.e. original information is related with the maximum Dmas61 and the minimum Dmin61 of density in FIG. 28, the record lengths $l_{61}$ to $l_{69}$ and positions of density variations $x_{62}$, $x_{64}$, etc. (FIG. 30) on the recording medium, and these in turn are considered to be related with the reproduce output voltages at Emax61, Emin61 and points of time $t_{61}$ to $t_{610}$ in FIG. 29.

Of course, the above-described reproduce output voltages at points of time $t_{61}$ to $t_{610}$ and the amplitude values of such reproduce output voltages are important in the recording of FM modulation signals or digital data signals but also in the recording of any type of information. In digital recording, density ranges corresponding to "0" and "1" are allowed for to discriminate between digital signals "0" and thus, density need not always be maximum or minimum.

Figure 30:
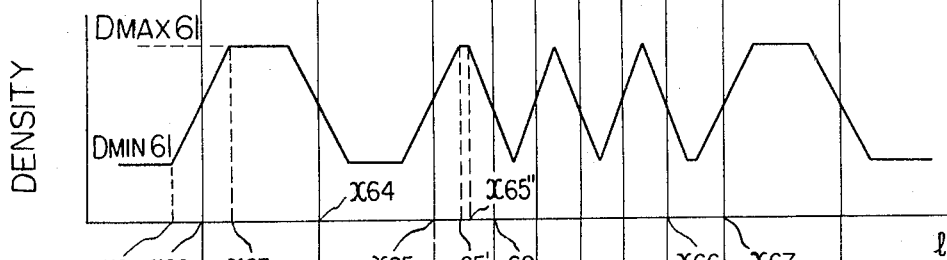

FIG. 30 shows an example of a desirable record pattern which has taken the above-noted points into account and is possible under the limitations that the maximum and minimum values of the record density be near the greatest values within the possible range and also be constant irrespective of the record length in order to widely utilize the recordable density range of recording medium, herein, silver salt film, and that recording be effected by the use of a light spot having a limited diameter.

In FIG. 30, it should be noted that the gradient of the density variation at various positions on the recording medium corresponding to the time points $t_{64}$, $t_{65}$, $t_{66}$, $t_{67}$ and $t_{68}$ must be (4/3) times that in FIG. 29.

Figure 31:
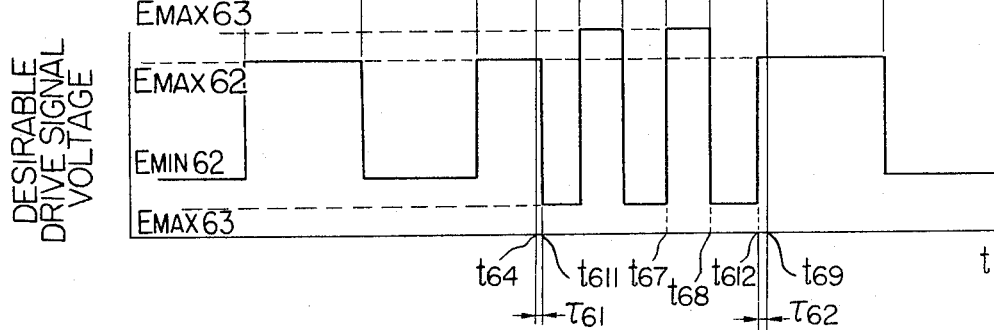
FIG. 31 illustrates the drive signal voltage waveform for providing the density waveform shown in FIG. 30.

FIG. 31 shows a desirable drive signal voltage E for the light modulator to provide a record pattern having the density vairation as shown in FIG. 30. Here, attention is called to the falling time point $t_{611}$ of the drive signal voltage corresponding to the time point $t_{64}$ and to the rising time point $t_{612}$ corresponding to the time point $t_{69}$, the falling time point $t_{611}$ being later by $\tau_{61}$ than the time point $t_{64}$ and the rising time point $t_{612}$ being earlier by $\tau_{62}$ than the time point $t_{69}$. In FIG. 30, it is assumed that a light spot having a diameter $d_3$ approximate to the record length $l_{63}$ is moved along the abscissa 1 to effect recording. In the density variation at the position in FIG. 30 corresponding to the time point $t_{61}$, the distance from the position $x_{61}$ whereat rising of the density occurs, to the position $x_{63}$ whereat the density attains a predetermined value, is equal to the diameter $d_3$ of the light spot. Thus, recording from the position $x_{61}$ to the position $x_{65}$ shown in FIG. 30 may be accomplished by causing the drive signal voltage to be varied from Emin62 to Emax62, as shown in FIG. 31, at a time point whereat the center of the light spot moving along the abscissa has come to the position $x_{62}$.

Figure 32:
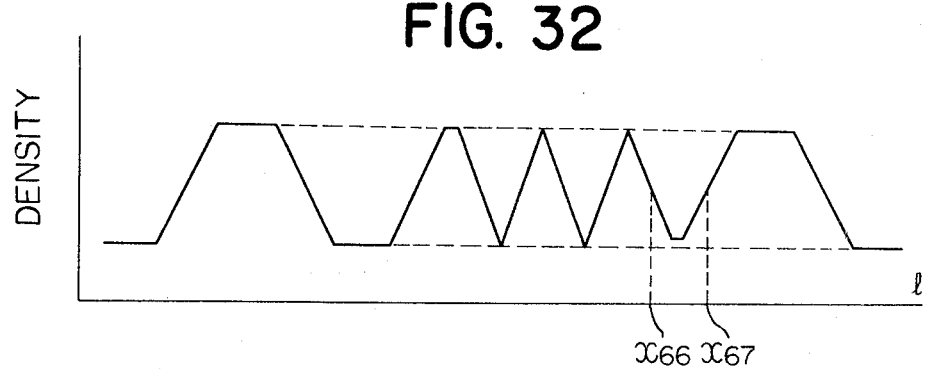
Figure 33:
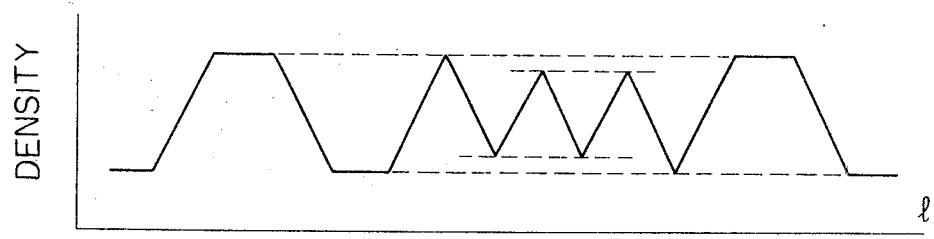
Figure 34:
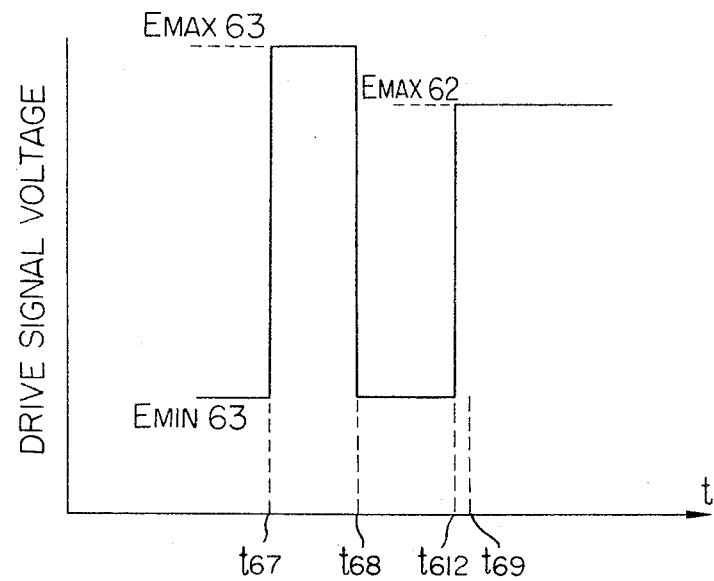
FIG. 34 is an enlarged view of essential portions of FIG. 31.
Figure 35:
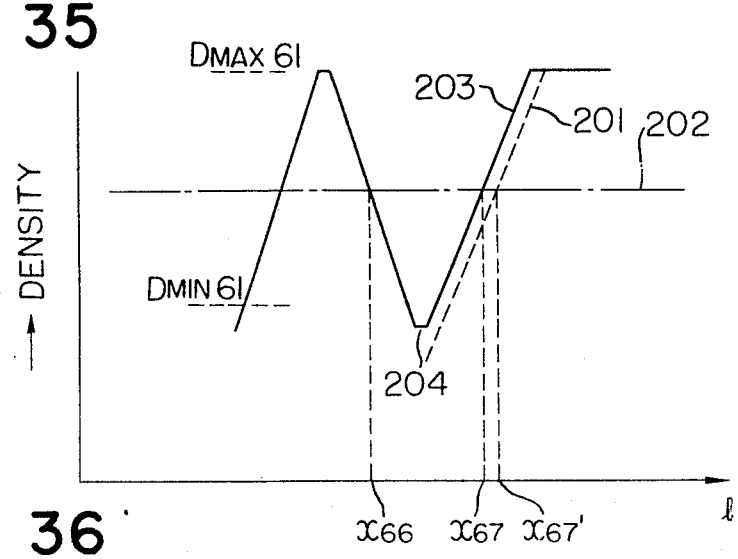
FIG. 35 is an enlarged view of essential portions of FIG. 30.
Figure 36:
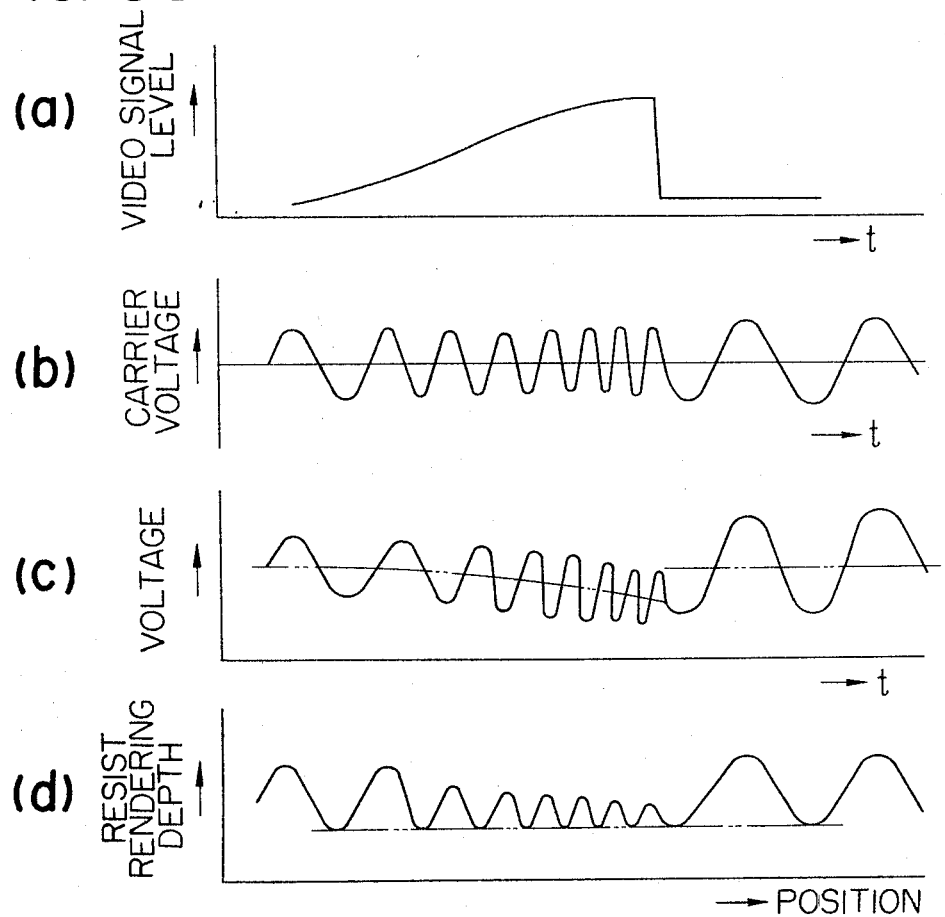
FIGS. 36(a), (b), (c) and (d) show the signal waveforms and the resist rendering depth for illustrating the present invention.

Near the position $x_{64}$, the recording is also similar to what has been described just above. However, at the position $x_{68}$ corresponding to the time point $t_{64}$, the density gradient must be 3/2 times that at the position $x_{62}$ or $x_{64}$, as already mentioned, and if the drive signal voltage were varied from Emax62 to Emin63 at the time point $t_{64}$ whereat the center of the light spot was at the position $x_{68}$, the density gradient could certainly increased to 3/2 times but density variation would start at the position $x_{65}$, and the resultant record pattern would differ from that as shown in FIG. 30. Such record pattern may be avoided by causing the time point whereat the drive signal voltage is varied from Emax62 to Emin63 to be delayed by $$\tau_{61} = \frac{\text{distance from } x_{65'} \text{ to } x_{65''}}{vs},$$

which is the time required for the light spot to move from the position $x_{65'}$ to the position $x_{65''}$. That is, the time point $t_{611}$ later by time $\tau_{61}$ than the time point $t_{64}$ provides the time point for varying the drive signal voltage to accomplish the desirable recording as shown in FIG. 31. Also, how to provide the density gradient at the position $x_{66}$ can be considered in a similar manner. FIG. 32 shows a record pattern provided by using the corrected drive signal voltage shown in FIG. 31, and FIG. 33 shows a record pattern resulting from the use of an uncorrected drive signal voltage. Thus, the effectiveness of correction will be seen. The record pattern in the section between the positions $x_{66}$ and $x_{67}$ in FIG. 32 will particularly be discussed in conjunction with FIGS. 34 and 35. In FIGS. 34 and 35, the abscissa and the ordinate are enlarged to double size but the points of time and the positions shown there are identical to those shown previously.

The variation in the drive signal voltage from Emax63 to Emin63 at the time point $t_{68}$ in FIG. 34 may directly be realized to provide the density gradient at the position $x_{66}$ in FIG. 35, but when the next time point for varying the drive signal voltage is set to $t_{69}$ the resultant density gradient will be such as indicated by broken line 201 in FIG. 35. Under such condition, in spite of the desire that the record density be varied with respect to line 202, the position whereat the line 201 passes the line 202 will be $x_{67'}$, thus causing an error. Such error could be corrected as indicated by solid line 203 in FIG. 35 if the time point for the variation of the drive signal voltage were shifted from $t_{69}$ to $t_{612}$, but, in a portion 204, exposures at time points $t_{68}$ and $t_{612}$ would overlap each other to create a flat portion as indicated in FIG. 35, and the level of Dmin61 could not be reached, although this is tolerable. Summing up what has been described hitherto, when the record length $l_s$ on the recording medium is in the relation $l_s > d$, where d is the diameter of the light spot employed for the recording, the drive signal voltage need not be corrected, whereas $l_s < d$, the drive signal voltage need be corrected and particularly, when the record length $l_s$ is transiently varied, it is also necessary to vary the amount of variation in the drive signal voltage and the time point for varying the drive signal voltage (hereinafter referred to as "correction time point"). Especially, in the latter case, determination of the correction time point depends on the duration of the condition, namely, Emax or Emin, of the drive signal voltage prior to the correction time point and the duration of the condition, namely, Emax or Emin, of the drive signal voltage which will ensue.

Detailed description has been made of the production of the error component resulting from non-uniformity of beam energy distribution and the production of the error component resulting from a limited diameter of a beam, during the recording of information on a recording medium by the use of the beam. Now, description will be made of specific embodiments of the signal recording device according to the present invention which intends to reduce such error components.

In any of these specific embodiments, the underlying basic principle is that a control signal corresponding to the frequency of a signal to be recorded is generated to thereby vary the level of the signal which is to be recorded.

FIGS. 36 to 40 are useful to illustrate the case where signals are recorded by forming concavo-convexities on a recording medium. FIG. 36(a) shows a part of a video signal and FIG. 36(b) shows the voltage waveform of a carrier frequency-modulated by the video signal. Addition to this voltage of a predetermined DC voltage and a voltage having a functional relation corresponding to the level of the video signal will result in the provision of a voltage as shown in FIG. 36(c). If this latter voltage is applied to the light modulator of FIG. 1, the intensity at the center of the rectilinearly distributed light provided on the resist surface will assume a value proportionate to the voltage waveform shown in FIG. 36(c). If such light is thrown upon the resist of the disc 101 as the latter is rotated at a predetermined velocity, the resultant wave-like convavo-convexities will be configured, upon development, as shown in FIG. 36(d).

Figure 37:
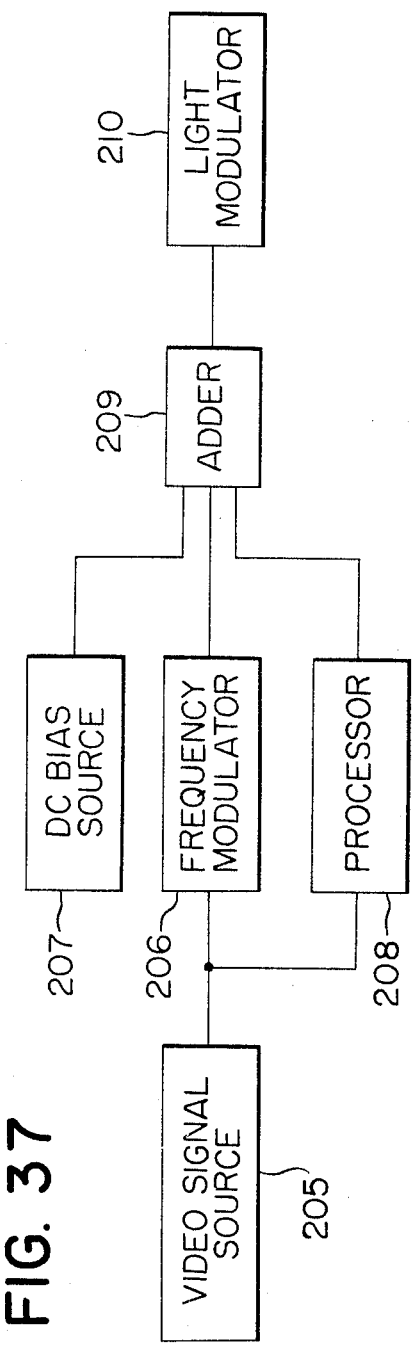
FIG. 37 is a block diagram for illustrating a recording method according to the present invention.

In FIG. 36(d), it is seen that the peaks, or in the drawing, the bottoms, of the waveform on the resist surface, are uniform in height. In playing back a record manufactured by transferring the so produced waveform of the resist, the engagement with the stylus will not be such as shown in FIGS. 13 and 14, thus enabling smooth detection of carrier signal. FIG. 37 shows a block diagram of a circuit for treating electrical signals as described above, wherein an electrical signal from a video signal source 205 such as, for example, a video tape recorder, is applied to a frequency modulator 206, which generates a voltage having a frequency variable in a linear relation with respect to the level of the video signal.

FIGS. 38(a) and (b) depict the video signal and corresponding carrier waveform, respectively. A DC bias source 207 provides a voltage to be applied to the light modulator in order to obtain a bias light for forming gutter-shaped stylus guide grooves, namely, a light corresponding to the light b previously described in connection with FIG. 3.

An adder circuit 209 effects addition of the voltages from the DC bias source 207 and the frequency modulator 206. The resultant voltage will be such as shown in FIG. 38(c). On the other hand, the voltage from the video signal source is applied to a processor 208. Before describing the processor, the record waveform provided without the use of the processor will be considered more fully. As the recording frequency is higher, the amplitude of the exposure onto the recording surface is decreased as shown by equation (3).

The value of the exposure amplitude for a certain value of $\omega$ may be expressed as $Ke^{-k\omega^2}$, where K and k are constants.

If the voltage variable at a predetermined amplitude as shown in FIG. 38(c) is used to drive the modulator which has a transmittivity proportionate to the voltage, and if the amplitude of exposure for $\omega 1$ is $A\omega 1$ with K as constant, then $$A(\omega_1) = Ke^{-k\omega_1^2} \quad (4)$$

If the frequency is $\omega m$, the amplitude thereof is likewise $$A\omega m = Ke^{-k\omega^2 m} \quad (5)$$

The difference between the two is:

$$A\omega - A\omega m = K(e^{-k\omega 1^2} - e^{-k\omega 2m}) \quad (6)$$

Now, let $\omega_1$, $\omega_2$ and $\omega_m$ be the carrier frequencies for video signal voltages $V_1$, $V_2$ and $V_m$, respectively. Then, $$\omega_m = \omega_1 + \frac{\omega_2 - \omega_1}{V_2 - V_1}(V_m - V_1) \quad (7)$$

Therefore, from $A\omega 1 - A\omega m$ or the difference in height between the peaks of the concavo-convex waveform on the record, namely, the value of $\beta$ in FIG. 38(d), is given by equations (6) and (7):

$$\beta = A\omega 1 - A\omega m \quad (8)$$
$$= \left[ e^{k\omega 1^2} - e^{-k\left(\omega 1 + \frac{\omega_2 - \omega_1}{V_2 - V_1}(V_m - V_1)\right)^2} \right]$$
$$= F(V_m)$$

In order to minimize $\beta$, the light modulator may thus be driven by a voltage provided by $-aFl(V_m)$ being added to the voltage shown in FIG. 38(c). The constant a herein is a voltage applied to the light modulator for providing a unit depth of resist rendering. The procedure 208 is a circuit for providing the $aFl(V_m)$, and the output therefrom is opposite in polarity to the voltage as shown in FIG. 38(e).

By causing the voltage from the processor 208 to vary the voltage of FIG. 38(c) in the relation of $aF_1(V_m)$ with respect to the video signal voltage in the described manner, correction may be made of any variation in height of the convex portions of the wave-like concavo-convexities on the record which will occur when the light modulator is driven by a predetermined bias voltage and a predetermined amplitude voltage. This may be accomplished as by a known clipper employing a diode to clip the video signal at the level $V_1$ and by using an amplifier capable of setting the amplification factor of the clipped output to any desired value.

The waveform so corrected is shown in FIG. 38(f).

In the foregoing, $Fl(V_m)$ has been used to provide the voltage which is to be applied to the adder circuit 209 to correct the above-mentioned step difference $\beta$ but of course, it is also possible to provide a correcting voltage from the modulated carrier frequency. In the latter case, the following equation may immediately be given by equation (6) above:

$$\beta = K(e^{-k\omega^2} - e^{-\omega^2}) = F2(\omega m) \quad (9)$$

Figure 39:
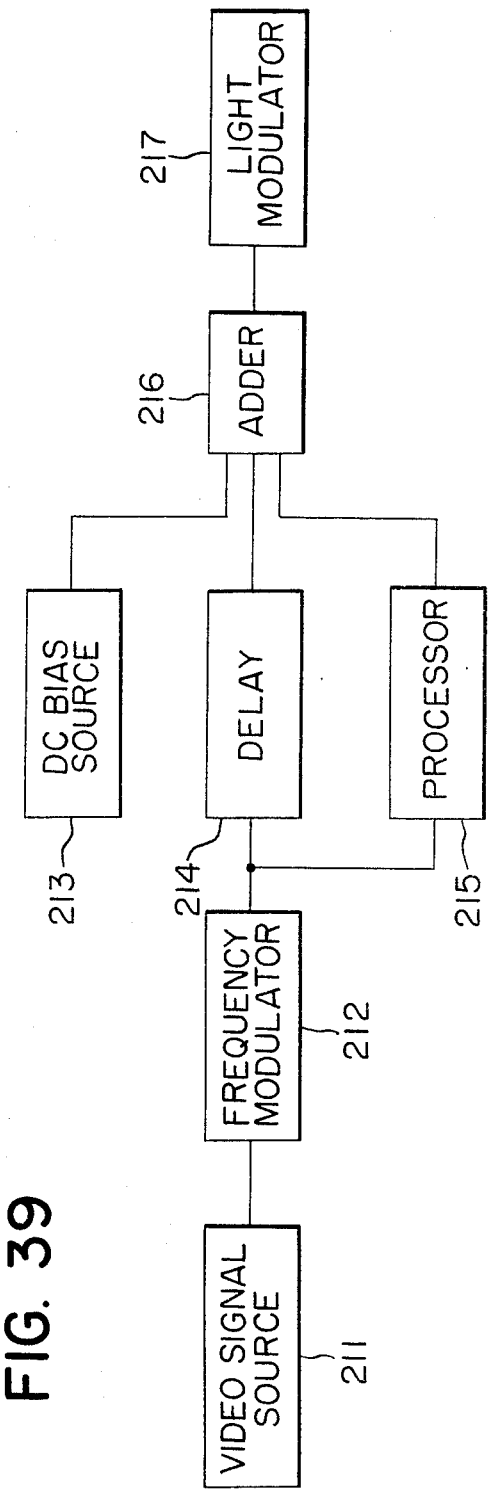
FIG. 39 is a block diagram showing another embodiment of the recording method according to the present invention.
Figure 40:
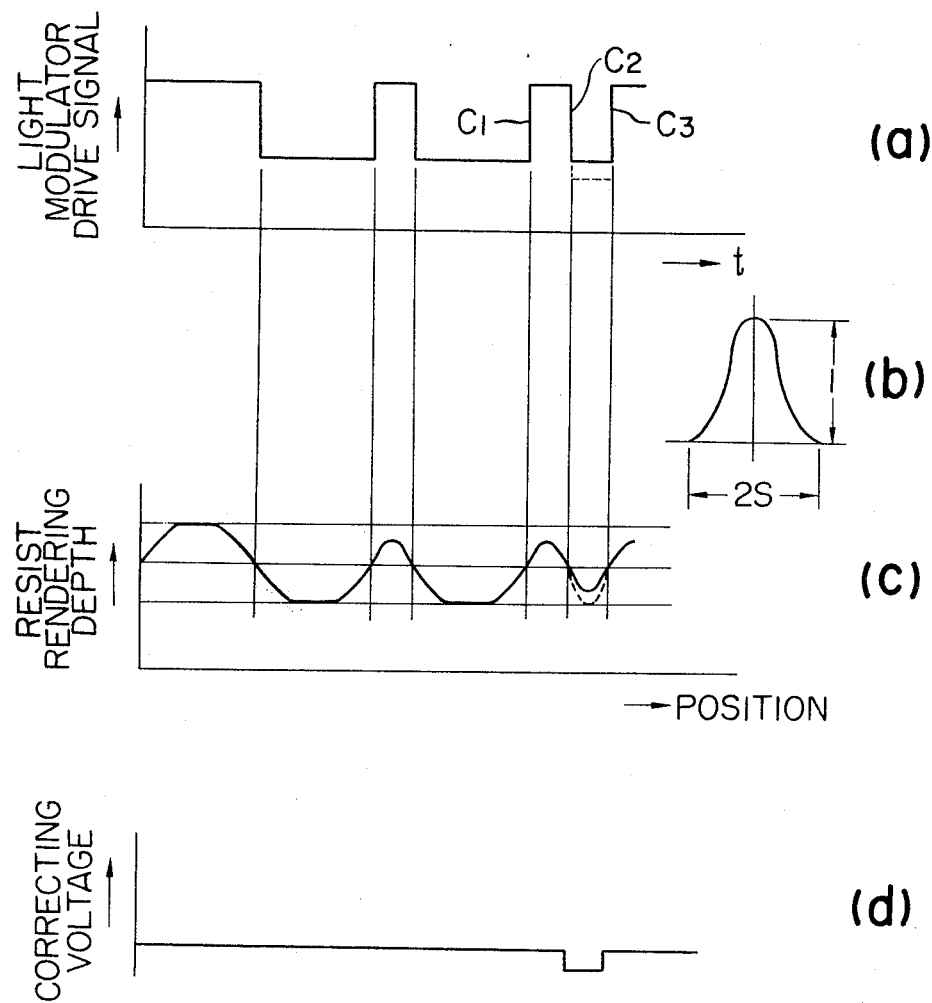
FIGS. 40(a), (b), (c) and (d) are illustrations of the present invention.

The circuit arrangement in this case is shown in FIG. 39, wherein 211 designates a video signal source, 212 a frequency modulator, and 213 a DC bias source, all these being functionally similar to those determined by 205, 206 and 207 in FIG. 37.

One of the outputs from the frequency modulator 212 is applied to the processor, which puts out a signal F2(ωm).

Designated by 214 is a delay circuit, which serves to provide to the carrier signal a retardation time required by the processor because, in producing a correcting voltage by the processor, a time delay is created to analyze the frequency modulated signal and in the absence of the delay circuit, the correcting signal experience a delay with respect to the frequency modulated signal to be recorded.

The reason why the delay circuit is necessary will be described a little more specifically. It is assumed that the carrier modulated by the frequency modulator 212 is shaped within the modulator and a DC voltage is added thereto to provide an output as indicated by solid line in FIG. 40(a).

In the case of such waveform, the modulation is usually called pulse frequency modulation, but for the sake of simplicity, description will be made with respect to such waveform.

If such voltage is applied to the modulator and the resist surface moving at uniform velocity is exposed to the light having a distribution as shown in FIG. 40(b) then there will be an amount of resist rendering as indicated by the solid line in FIG. 40(c).

The desiraable configuration of the resist surface is such as indicated by the broken line in FIG. 40(c), as has already been noted, and realization of such a configuration requires a voltage as indicated by the broken line in FIG. 40(a).

This is a sum of the voltage indicated by the solid line in FIG. 40(a) and the voltage indicated in FIG. 40(d), and when there are voltage variations as indicated at $C_2$, $C_3$ in FIG. 40(a), namely, a voltage variation for creating a narrow projection on the resist, it is necessary to generate a correcting voltage as shown in FIG. 40(d). However, whether the correcting voltage as shown in FIG. (d) is necessary or not is not yet found at the time point for the voltage variation $C_2$, and only at the time point for the voltage variation $C_3$ is it found that the correcting voltage should have been generated since the time point $C_2$.

Generation of such a correcting voltage is a function to be performed by the processor 215, which is thus required to foresee any carrier variation and to generate the correcting voltage prior to said carrier variation, whereas this is impossible to do. Actually, however, this may be realized by providing the delay circuit 214 to thereby cause the time when the variation in the carrier at a certain first time point reaches the adder circuit to be delayed with respect to the time when such variation enters the processor, whereby a correcting voltage found upon a second variation ensuing said first variation may be supplied to the adder circuit simultaneously with said first variation, thus providing the amount of resist rendering as indicated by broken line in FIG. 40(c).

Hitherto, the description has been made with respect to the case where the transmittivity of the light modulator is proportionate to the applied voltage, that is, the case where the light modulator is like an ultrasonic wave optical modulator element, but in case of the so-called electro-optical modulator element, the relation between the applied voltage and the transmittivity will be complex. It will therefore be apparent that the value of the correcting voltage must be one which has taken into account the characteristic of such modulator element.

According to the present invention, as will be appreciated from the foregoing description, the settling of the peaks of wave-like concavo-convexities in the short wavelength portion created when the light distribution formed on a recording medium by a condensing optical system may be corrected flatly over all the record frequencies by applying to a light modulator a correcting voltage derived as a function of the video signal level and of the carrier frequency, and this will be highly effective to optically record a configuration in which recorded concavo-convexities of short wavelength may be stably detected.

Now, elimination of the error signal incidental to the limited diameter of the beam will more fully be described with respect to another embodiment.

Figure 41A:
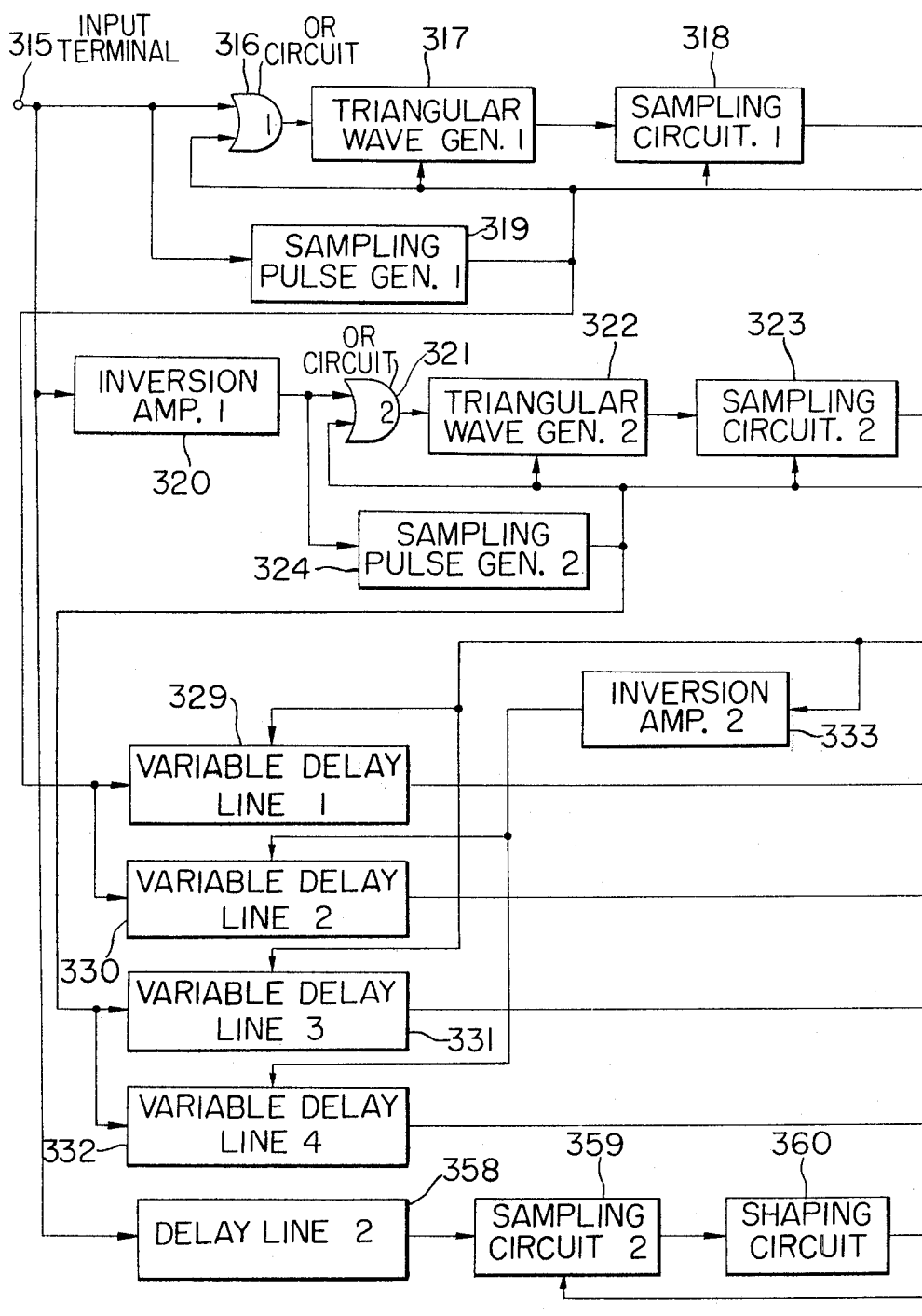
FIGS. 41A, B and C combine to show a block diagram showing the signal recording system according to the present invention.
Figure 41C:
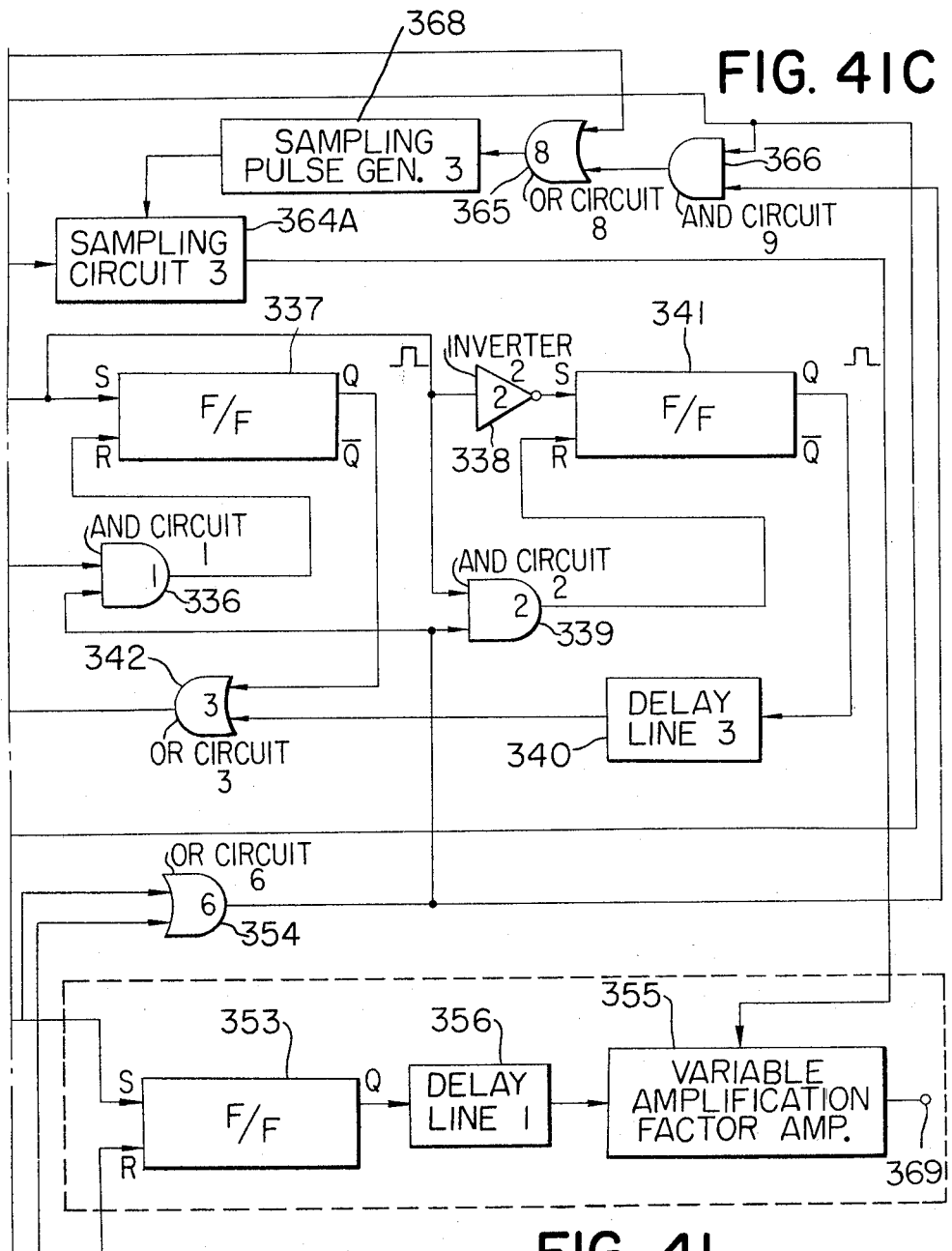
Figure 41:
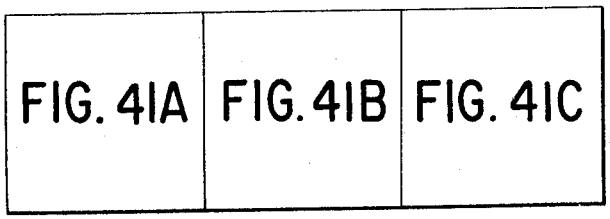

Referring to FIG. 41, it includes an input terminal 315 for the record signal to be corrected, an OR circuit 316, a triangular wave generator 317 which may comprise a conventional integration circuit, a sampling circuit 318 which may be of a conventional circuit design, a sampling pulse generator 319 which may comprise, for example, a trigger type blocking oscillator or the like, an inversion amplifier 320 which may be a conventional amplifier having an input and an output maintaining a linear relation therebetween and being opposite in phase, an OR circit 321, a triangular wave generator 322 similar to 317, a sampling circuit 323 similar to 318, a sampling pulse generator 324 similar to 319, a discriminator 325 which may be, for example, a conventional clipper using a diode or the like, conventional amplifiers 326 and 327, an amplifier 328 such as Schmidt circuit, well-known variable delay lines 329, 330, 331, 332 forming circuits in which retardation time is variable by control voltage, an inversion amplifier 333 similar to the inversion amplifier 320, and a circuit 334 which holds an input signal at the time point whereat the input signal has been applied and continues to hold the same till the time point whereat a gate signal has been cut off. There is further provided an inverter 335, an AND circuit 336, a set-reset type flip-flop 337, an inverter 338, an AND circuit 339, a delay line 340 having a fixed retardation time, a set-reset type flip-flop 341, an OR circuit 342, and AND circuits 343, 344, 345, 346. Further provided are inverters 347, 348, 349, 350, OR circuits 351, 352, a set-reset type flip-flop 353, an OR circuit 354, a variable amplification factor amplifier 335 which is a well-known circuit whose amplification factor is controllable by the utilization of the fact that the gm of a transistor is varied with emitter current, a delay line 356 having a fixed retardation time, and a pulse generator 357 similar to the sampling pulse generator 319. There is further seen a delay line 358 having a fixed retardation time, a sampling circuit 359 similar to 318, a shaping circuit 360 such as, for example, a Schmidt trigger circuit or the like, an inverter 361, an OR circuit 362, an AND circuit 363, an inverter 364, a sampling circuit 364A similar to the sampling circuit 318, an OR circuit 365, an AND circuit 366, a delay line 367 having a fixed retardation time, a sampling pulse generator 368 similar to the sampling pulse generator 319, and an output terminal 369 for leading out a corrected record signal voltage.

Operations of various portions will now be explained with reference to the waveforms shown in FIGS. 42 to 47.

Figure 42:
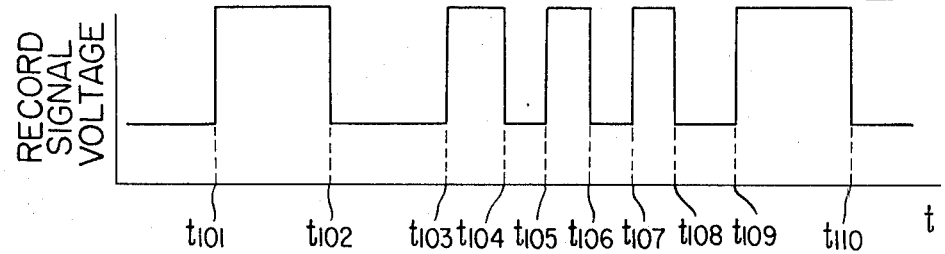
FIGS. 42–57 show waveforms at various points in FIG. 41 and are for illustrating the operation of FIG. 41.
Figure 43:
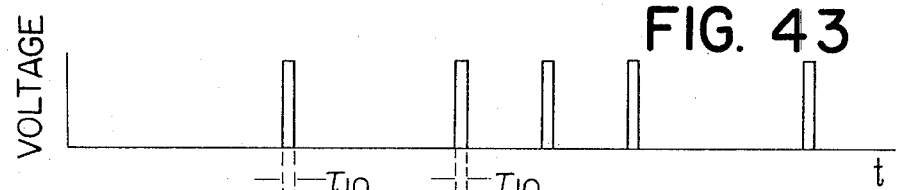
Figure 44:
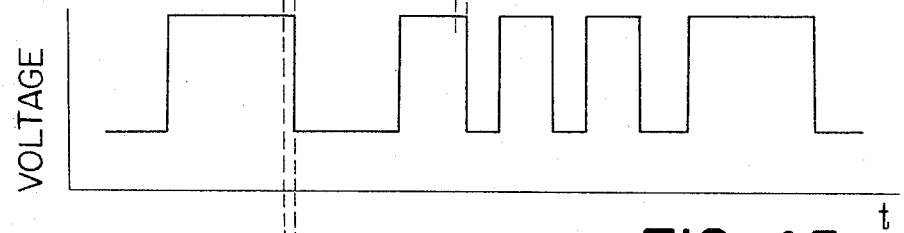
Figure 45:
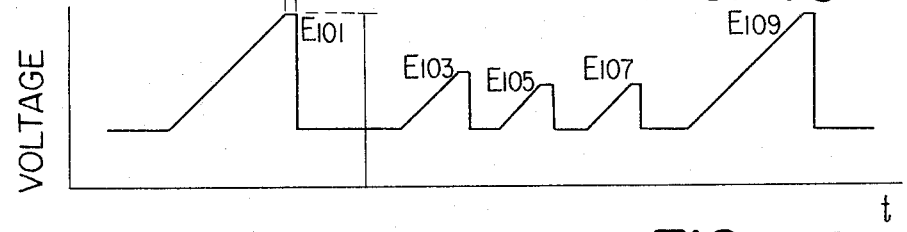
Figure 46:
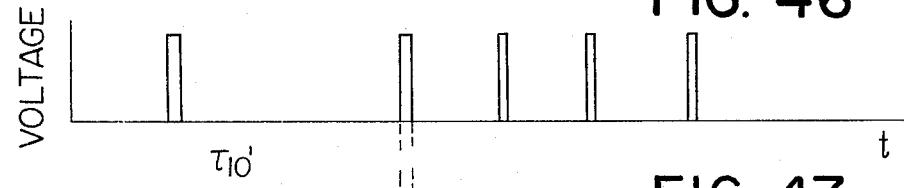
Figure 47:
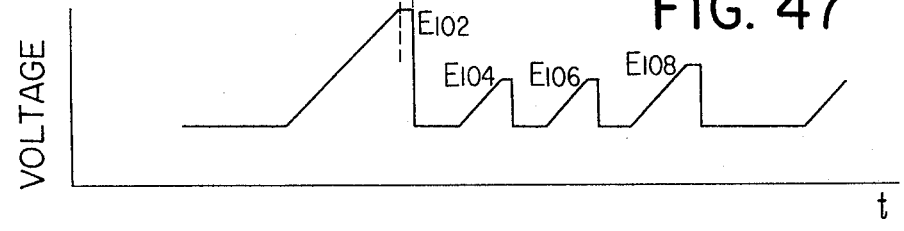
Figure 48:
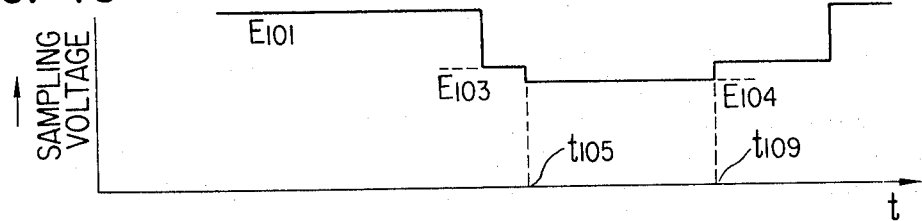
Figure 49:
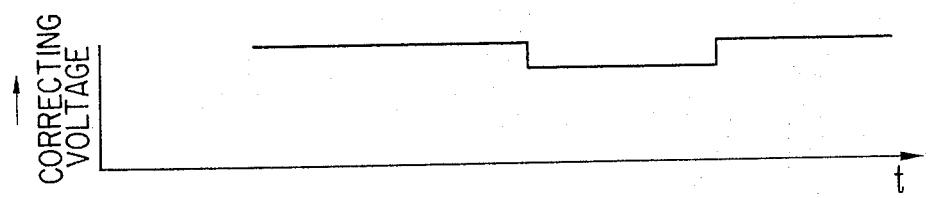
Figure 50:
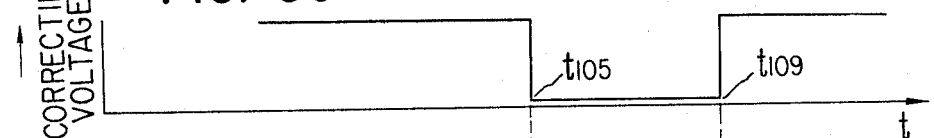
Figure 51:
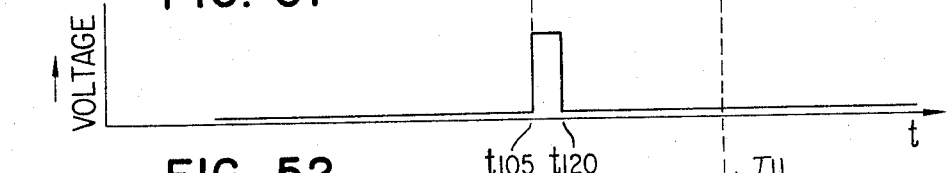
Figure 52:
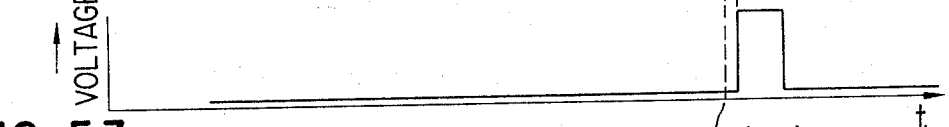
Figure 53:
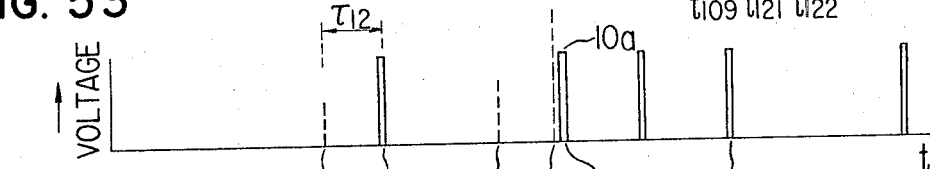
Figure 54:
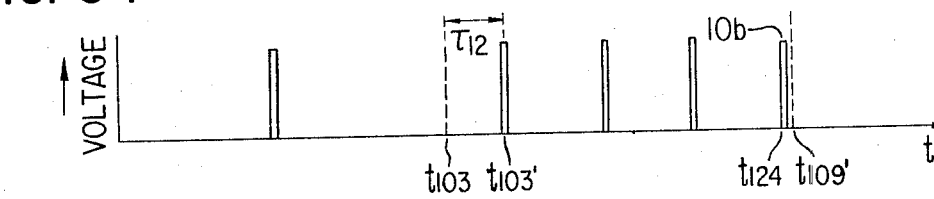
Figure 55:
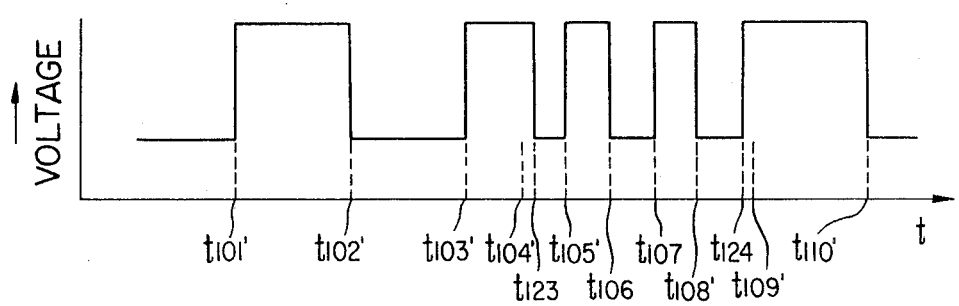
Figure 56:
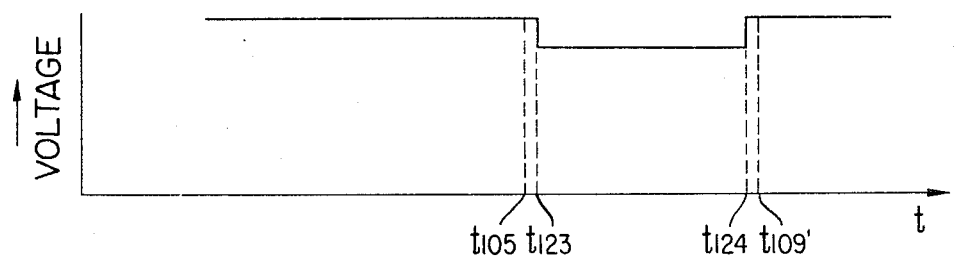
Figure 57:
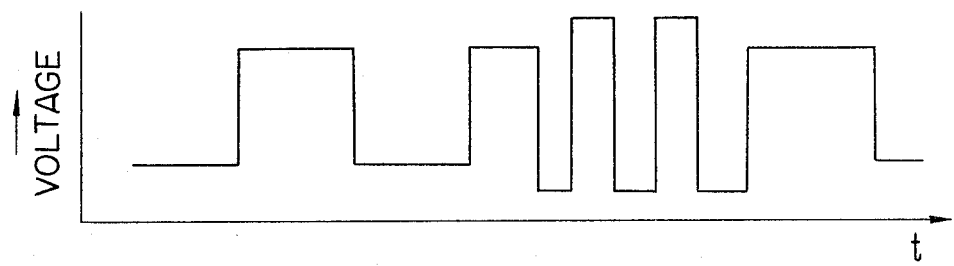

An example of the record signal voltage applied to the input terminal 315 for correction (hereinafter simply referred to as "signal") is shown in FIG. 42, wherein the time points for rising and falling of the signal, namely, for variation of the signal, are designated at $t_{101}$, $t_{102}$ and so on and time relations are such that
$t_{101} - t_{102} = t_{102} - t_{103} = t_{109} - t_{110}$ and
$t_{103} - t_{104} = t_{108} - t_{109}$,
$t_{104} - t_{105} = t_{105} - t_{106} = t_{106} - t_{107} = t_{107} - t_{108}$ and
$t_{101} - t_{102} = 2(t_{103} - t_{104})$, $t_{103} - t_{104} = (4/3)(t_{104} - t_{105})$.
One of such signals is applied to the OR circuit 316 and to the sampling pulse generator 319, which thus generates at the falling time point of the signal a sampling pulse 1 having a pulse width $\tau_{10}$ sufficiently shorter than the repetition time of the signal (see FIG. 43), and such pulse is applied to the OR circuit 316, so that the output of the OR circuit 316 takes a waveform having its falling time point delayed by $\tau_{10}$ as indicated in FIG. 44, and this input is applied to the triangular wave generator 317. FIG. 45 shows an integral voltage waveform (integral voltage 1) provided by the triangular wave generator circuit 317, wherein the flat portion of the time corresponding to $\tau_{10}$ at the vertex of the triangular waveform is provided to ensure reliable sampling action, and in an integral action wherein a capacitor, for example, is charged with a predetermined current to utilize the terminal voltage thereof to provide a triangular waveform, this may be accomplished by a circuit which will cause a discharging current equal to the charging current to flow out of the capacitor at $\tau_{10}$. The integral voltage is sampled by the sampling pulse (FIG. 43) generated by the sampling pulse generator 319 through the sampling circuit 318 comprising well-known means, and the flat peak portion of the integral voltage $E_{101}$ is held by an unshown hold capacitor. On the other hand, the recording signal is applied through the inversion amplifier 320 to the sampling pulse generator 324, from which a sampling pulse having a width $\tau_{10}$, substantially equal to the above $\tau_{10}$ is generated at the rising time point of the applied signal as is shown in FIG. 46, and in the same manner as described, an output waveform as shown in FIG. 47 may be provided by the triangular wave generator 322. An unshown common hold capacitor is provided to the outputs of the sampling circuits 318 and 323 and thus, the terminal voltage of that hold capacitor is varied to $E_{101}$, $E_{102}$, ... $E_{109}$, as will be seen from FIGS. 45 and 47. Here it is to be noted that $E_{101} = E_{102} = E_{109}$ and that $E_{103} = E_{108}$, $E_{104} = E_{105} = E_{106} = E_{107}$. As already described, the pulse width to be corrected is determined by the movement velocity of the recording medium, the time between the time points for signal variation, i.e. pulse width, and the diameter of the light spot used for recording, and thus, the sampling voltage shown in FIG. 48 has a certain value corresponding to the pulse width to be corrected. In the present example, it is $E_{103}$ corresponding to the time between the points $t_{103}$ and $t_{104}$. The discriminator 325 performs the function of providing an output only when the sampling voltage is less than $E_{103}$, and the output thereof is shown in FIG. 49. (The output shown in FIG. 49 will hereinafter be called the correcting voltage.) The correcting voltage is applied to each of the amplifiers 326, 328 and 327, of which the amplifiers 326 and 327 each is a conventional linear amplifier having its input and output maintained in a linear relation and these provide correcting voltages 1 and 3 as their respective outputs, while the amplifier 328 is, for example, a Schmidt circuit which puts out an ON-OFF signal, such output being hereinafter called the correcting signal 2 (see FIG. 50). The variable delay lines are designated by 329, 330, 331, 332, of which 329 and 331 are of the type wherein retardation time is increased with a later-described predetermined retardation time as the reference, because of their combination with the output of the gate circuit 334, while the delay lines 330 and 332 are of the type wherein the control voltage is made opposite in phase by the inversion amplifier 333 so that the retardation time is decreased. The correcting voltage 2 of the amplifier 328 is applied through the flip-flop 337 and the inverter 338 to the flip-flop 341. The flip-flop 337 is set at the falling time point of the signal shown in FIG. 50, and the flip-flop 341 is set at the rising time point of the signal. On the other hand, the outputs of the OR circuit 354 generated at the rising and falling time points of the corrected signal provided in a manner to be described are being applied to the AND circuits 336 and 339, so that the flip-flop 337 is set at the time point $t_{105}$ whereat the correcting voltage 2 is generated, whereafter the flip-flop 341 is reset by the output from the OR circuit 354 (as indicated at 10a in FIG. 53), and the flip-flop 341 is at the time point $t_{109}$ whereat the correcting voltage 2 is terminated, and triggered by the output from the OR circuit 354 (as indicated at 10b in FIG. 54, whereby the Q output of the flip-flop 337 becomes such as shown in FIG. 51 while the Q output of the flip-flop 341 becomes such as shown in FIG. 52. Since the delay line 340 has a retardation time $\tau_{11}$ substantially equal to or slightly longer than the time $\tau_{10}$ or $\tau_{10'}$, there is applied to the input of the OR circuit 342 a signal having, as shown in FIG. 52, a pulse width from the time point $t_{121}$ later by $\tau_{11}$ than the time point $t_{109}$ till the time point $t_{122}$ later by $\tau_{11}$ than the time point $t_{124}$ which will hereinafter be described. The Q outputs of the flip-flops 337 and 341 are mixed together by the OR circuit 342 and applied to the gate circuit 334, which puts out the correcting voltage 3 from the amplifier 327 only as long as the pulse exists. This output is passed through the variable delay lines 329, 331 and the inversion amplifier 333, then applied to the variable delay lines 330 and 332. The variable delay lines 329 and 331 effect control of the retardation time only on the pulses applied at first to the variable delay lines 329 and 331 from the time point whereat the pulses shown in FIG. 51 and 52 were generated, namely, the time point whereat the correcting voltages were generated, and put out delays with respect to a predetermined retardation time, while the variable delay lines 330 and 332 put out advances with respect to the predetermined retardation time. The outputs of the variable delay lines 329 and 332 are shown in FIGS. 53 and 54, respectively, wherein it is seen that the time between the time points $t_{102}$ and $t_{102'}$ whereat the correcting voltage 3 is not generated or the time between the time points $t_{103}$ and $t_{103'}$ corresponds to the predetermined retardation time $\tau_{12}$, while the pulse 10a (hereinafter called the corresponding pulse) is delayed from the point of time $t_{104'}$ due to the correcting voltage 3, and the point of time $t_{109'}$ is advanced from the point of time $t_{124}$. The reason that two sets of variable delay lines are provided is that whether the correcting pulse should selectively delayed or advanced must be considered both at the rising time point of the correcting signal and at the falling time point of the correcting signal, and the predetermined retardation time is selected to a value substantially equal to or shorter than the threshold value of the signal pulse width time to be corrected, namely, the time between the time points $t_{103}$ and $t_{104}$. The pulse generator 357 generates a pulse at the rising time points $t_{105}$ and $t_{121}$ of the output pulse of the OR circuit 342, and the sampling circuit 359 samples a signal passed through the delay line 358 having a retardation time substantially equal to the predetermined retardation time $\tau_{12}$ of the variable delay lines 329–332, thereby determining, from the sample voltages at the time points $t_{105}$ and $t_{121}$, whether the correcting pulse at $t_{123}$ and $t_{124}$ has been generated at the rising or the falling time point of the correcting voltage. The output of the sampling circuit is shaped by the shaping circuit 360 such as a Schmidt circuit, whereafter it is applied through the AND circuits 344, 346 and the inverter to the AND circuits 343, 345. If the generation of the correcting pulse corresponds to the rising time point of the correcting signal 2 due to the combination of the AND circuits 343–346 and respective variable delay lines 329–332, then the AND circuits 344 and 346 will be operated, and if the generation of the correcting pulse corresponds to the falling time point of the correcting signal 2, the AND circuits 343 and 345 will be operated. The outputs of the AND circuits 344 and 346 in the present embodiment are shown in FIGS. 53 and 54, respectively. The outputs of the AND circuits 343 and 344 are passed through the inverters 347 and 348 and mixed together by the OR circuit 351a, thereafter a applied to the set terminal of the flip-flop 353. On the other hand, the outputs of the AND circuits 345 and 346 are applied through the inverters 349 and 350 to the OR circuit 352, the output of which is supplied to the reset terminal of the flip-flop 353. The waveform of the Q output of the flip-flop 353 is shown in FIG. 55. The OR circuit 362 puts out a pulse at each of the rising and the falling time points of the signal, which pulse is passed through the AND circuit 363 and the OR circuit 365 to the sampling pulse generator 368, by which said pulse is made into a sampling pulse which will enable the later-described sampling action to be effected satisfactorily and which is sufficiently narrower in width than the correcting pulse width, whereafter the sampling pulse is applied to the ring pulse input terminal of the sampling circuit 364A. By the output of the inverter 364 of which the input is connected to the output of the OR circuit 342, the output of the AND circuit 363 is blocked at the time point whereat the correcting pulse is being generated and at such time, the output of the OR circuit 354 is applied through the AND circuit 366 and the OR circuit 365 to the sampling circuit 368, which thus provides an output having a waveform as shown in FIG. 56. Here, it should be noted that the delay line 367 has a retardation time substantially equal to the aforementioned sampling pulse width $\tau\tau_{10}$, so that the sampling pulse generated at the time point $t_{108}$ holds a voltage corresponding to $E_{104}$ and is newly sampled and held by a subsequent sampling pulse generated at the time point $t_{124}$. The output of the sampling circuit 364A is shown in FIG. 56. The output of the sampling circuit 364A is supplied to the variable amplification factor amplifier 355 and its gain is varied by the signal of FIG. 56 in such a manner that the gain is increased if that signal is low, but ampliciation is constant during the time when no correction is needed, and there is thus provided a corrected record signal voltage as shown in FIG. 57, at terminal 369. The delay line 356 is used to correct a time delay corresponding to the pulse width of the sampling pulse.

In the foregoing description, silver salt film has been taken as an example of the recording medium and a characteristic thereof has been assumed a reside in a linear relation of density with exposure. Generally speaking, however, such assumption may only be established for a very much limited part of the density range within which a density variation can be recorded on a recording medium.

Figure 58:
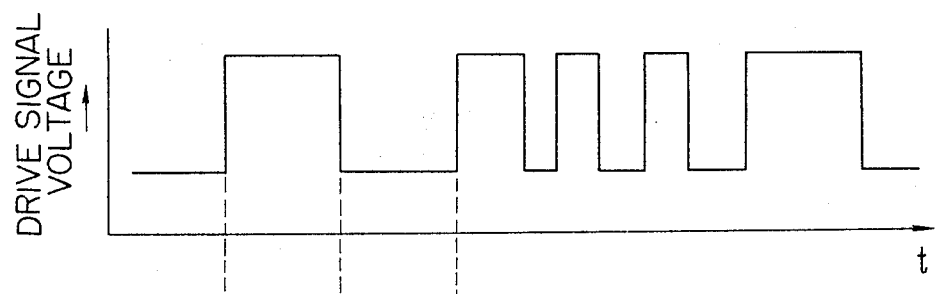
FIGS. 58–60 illustrate the case where the exposure and the record density on the recording medium are not in linear relation, FIG. 58 showing the drive signal voltage waveform, FIG. 59 being an illustration of the exposure, and FIG. 60 being a waveform diagram showing the record density on the recording medium.
Figure 59:
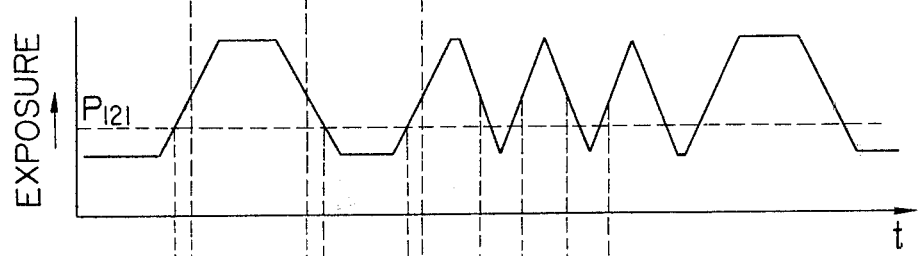

Description will now be made of the correction effected in the event that the aforementioned linear relation is not satisfied or, extremely, in the event that density exhibits a bivalent variation such as Dmin12 for an exposure less than a certain threshold value and Dmax12 for an exposure greater than said threshold value. Hereinafter, the correction described in connection with FIGS. 41–57 will be referred to as the first correction, and the correction which will be described in connection with FIGS. 58–74 will be referred to as the second correction. FIG. 58 shows an example of the record signal voltage subjected to the first correction, and FIG. 59 shows the exposure imparted to the recording medium. FIGS. 58 and 59 correspond to FIGS. 31 and 30, respectively, and their coordinates are similar to those of FIGS. 28 and 29. It is assumed that a recording medium, in the present example, silver salt film, has its threshold value of exposure at $P_{121}$ indicated in FIG. 59 and that density assumes Dmax121 for an exposure greater than $P_{121}$ and Dmin121 for an exposure less than $P_{121}$. Then, the resultant record pattern will be such as shown in FIG. 60.

Figure 60:

It will be seen in FIG. 60 that the record pattern shown there differs from that shown in FIG. 28 and creates errors such as $l_{121}$, $l_{122}$, etc.

Figure 61:
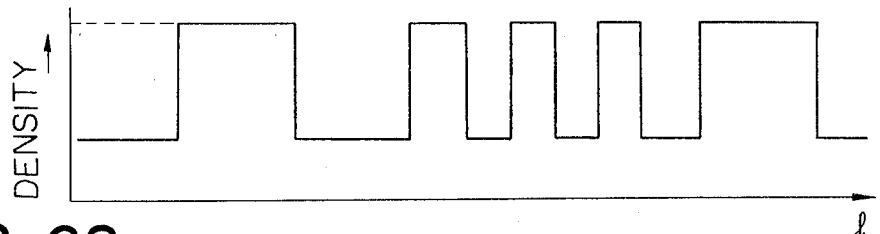
Figure 62:
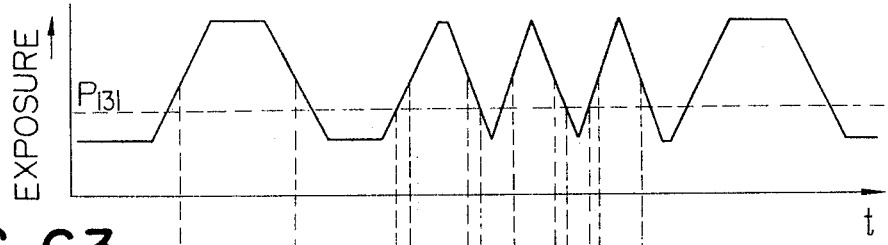
Figure 63:
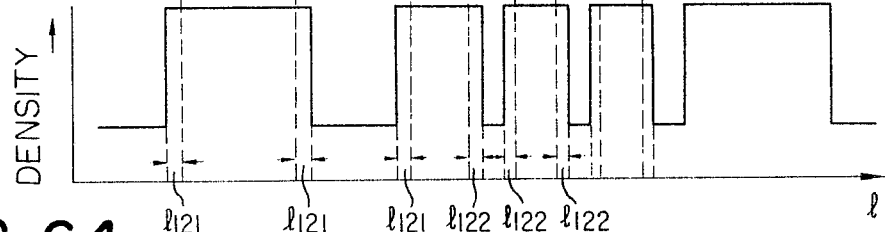

FIGS. 61–65 refer to the cases where the second correction has been imparted to the record signal voltage already subjected to the first correction. FIG. 61 shows a desirable record pattern (identical to FIG. 28), FIG. 62 shows an exposure imparted to the recording medium by the record signal voltage subjected to the first correction (identical to FIG. 59), and FIG. 63 shows a record pattern on the recording medium when the threshold value of exposure is $P_{131}$ (identical to FIG. 60). In FIG. 63, the error lengths are indicated by $l_{121}$ and $l_{122}$.

Figure 64:
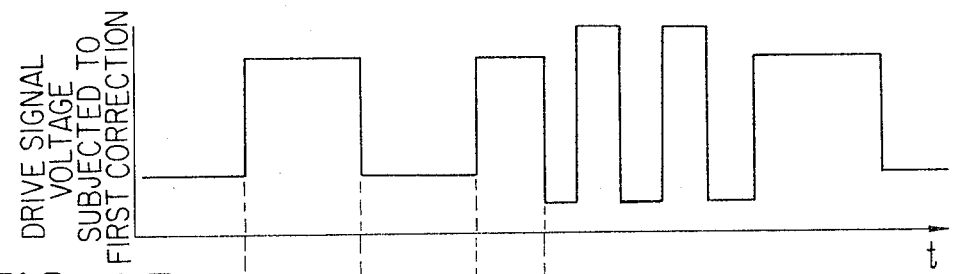
Figure 65:
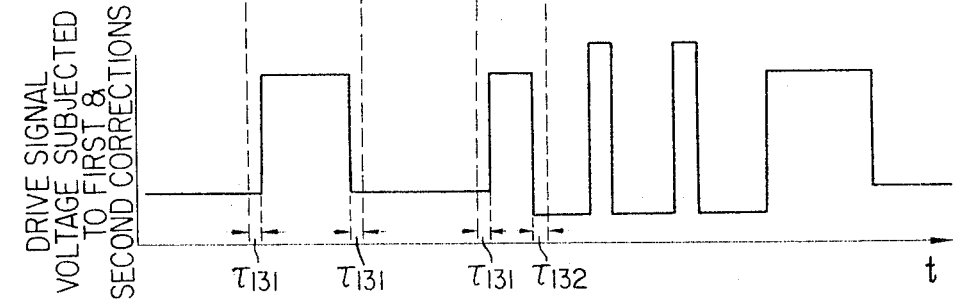

The second correction in these cases may be considered as follows: Since correction may be achieved if the time point for the variation of the record signal voltage is advanced or delayed by a time corresponding to l/v in a manner related with the error length l in the record pattern and the movement velocity v of the recording medium, the second correction may be effected in such a manner as shown in FIG. 65, namely, with delay, advance, . . . delay etc. by times $\tau_{131} = (l_{121}/v)$ and $\tau_{132} = (l_{122}/v)$, respectively. For information, the record signal voltage not subjected to the second correction is shown in FIG. 64. The times $\tau_{131}$ and $\tau_{131}$ will be determined if the gradient at the time point for the exposure variation and the threshold value of the exposure are given.

FIG. 66 shows variation in exposure with time caused by the record signal voltage subjected to the second correction (see FIG. 64), and FIG. 67 shows the record pattern when the threshold value $P_{131}$ of FIG. 66 exists. From these, it is seen that the second correction is effective. In this case, the disturbance as indicated at 370 in FIG. 66 offers no problem inasmuch as the threshold value exists in the exposure.

The method for the second correction is more specifically shown in FIG. 68. FIG. 68 is to replace the circuit encircled by a dotted line in FIG. 41, and the functional blocks duplicate those in FIG. 41 and are given similar reference numerals and need not be described in detail.

In FIG. 68, numeral 371 designates a variable delay line, and numeral 372 denotes a stretcher which performs the function of causing the voltage of the input signal at the point of time whereat the correcting voltage is terminated to be maintained for a predetermined time, and may use, for example, a D/A converter which puts out at said time point the voltage data stored in a shift register and holds such output, and then is reset after a predetermined time.

Numeral 373 designates an output terminal for the record signal voltage subjected to the first and the second correction. For convenience of the following description, the Q output of the flip-flop 353 is shown in FIG. 69. The output of the OR circuit 351 is applied to the variable delay line 371, which provides an output having a retardation time $\tau_{141}$, $\tau_{142}$ preset in connection with the threshold value of the exposure, the movement velocity of the recording medium and the diameter of the light spot. Herein $\tau_{141}$ is the retardation time at the time when no correcting voltage is being generated and, in view of the fact that at the time when the correcting voltage is being generated, the gradient of the exposure is varied as shown in FIG. 62, the retardation time is caused to vary in a manner related with the correcting voltage so that the pulse recurrence interval is varied, with an assumption that $\tau_{142} = \tau_{132}$, and this effects the amount of correction.

The output of the variable delay line 371 is applied to the set input of the flip-flop 353 while the output of the OR circuit 352 (FIG. 71) is applied to the reset terminal of the same flip-flop, so that a signal as shown in FIG. 72 is derived at the Q output of the flip-flop 353. On the otherhand, the output of the sampling circuit 364A is passed through the stretcher 372 to provide a waveform as shown in FIG. 73. By the action of the stretcher 372, the correcting signal at the output of the sampling circuit 364A, although terminated at the time point $t_{124}$, is being stretched to the point of time $t_{151}$. The output of the variable amplification factor amplifier 355 has its amplitude controlled by the output of the stretcher 372 (see FIG. 73) in the same manner as described in connection with FIG. 41, so that it is transformed into the record or drive signal voltage having the first and the second corrections as shown in FIG. 74, and then applied to output terminal 373.

In the above detailed description of the present invention, it has been assumed that the light distribution of the light spot is uniform, but of course, the purport of the present invention is equally applicable not only to the cases where the light distribution is a Gaussian distribution, but also to the cases where the light spot is a rectangular spot instead of a circular one. Further, a rectangular waveform has been taken as an example of a record signal voltage, whereas the invention is also applicable to the recording of sinusoidal waveforms. Furthermore, the recording medium has been described as being a silver salt film, but other recording mediums such as, for example, photosensitive resin (photoresist) are also usable. Still furthermore, the purport of the present invention is also applicable to, for example, means which, during reproduction of a record pattern recorded with a predetermined density, corrects the difference in output amplitude corresponding to different record lengths of the record pattern which results from photoelectric conversion effected by the use of a reproduce light spot having a limited size. Further, where the variation in density, for example, of the record pattern is predetermined, the present invention enables an optimum drive signal voltage to be applied to a light modulator. Thus, the present invention is extremely effective.

We claim:

1. Apparatus for recording information on an information recording medium using a beam, comprising:
   beam forming means operative in response to modulating signals applied thereto for forming a corresponding modulated beam having a predetermined cross section and energy profile, said information recording medium being sensitive to the beam impinging thereon from said beam forming means;
   information means for introducing an information signal to be recorded on said information recording medium;
   pulse width control means, having the information signal coupled thereto as an input, for altering the pulse widths of the information signal, wherein said pulse width control means provides an altered output signal, said control means comprising delay means for altering the time of occurrence of the leading edges of pulses included in the information signal in accordance with the wavelength of the information signal; and
   means coupled to said beam forming means and said pulse width control means for applying the altered output signal to said beam forming means as a modulating signal, wherein variations in the exposure of said recording medium which would otherwise occur as a result of said predetermined beam cross section and energy profile are prevented.

2. Recording apparatus according to claim 1, further comprising means for modifying the level of the information signal in accordance with the wavelength of the information signal.

3. Apparatus for recording information on an information recording medium using a beam, comprising:
   beam forming means for forming a beam whose intensity depends upon the level of modulating signals applied thereto, the beam having a predetermined cross section and energy profile, said information recording medium being sensitive to the beam impinging thereon from said beam forming means;
   information means for introducing an information signal to be recorded on said information recording medium;
   pulse width control means, having the information signal coupled thereto as an input, for altering the pulse widths of the information signal;
   means coupled to said information means for detecting a portion of the information signal which is shorter in wavelength than a predetermined value, and means coupled to said detecting means for modifying the level of said portion of the information signal in response to the output of said detecting means;
   means coupled to said beam forming means for applying the signal altered by said pulse width control means and said level modifying means to said beam forming means as a modulating signal; and
   means operatively connected to said beam forming means for moving the beam relative to said information recording medium;
   wherein variations in the exposure of said recording medium which would occur as a result of said predetermined beam cross section and energy profile are prevented.

4. Recording apparatus according to claim 3, wherein said level modifying means is operative to raise the level of the information signal in response to information signal wave-lengths below a predetermined value.

5. Apparatus for recording information on an information recording medium using a beam, comprising:

beam forming means operative in response to modulating signals applied thereto for forming a corresponding modulated beam having a predetermined cross section and energy profile, said information recording medium being sensitive to the beam impinging thereon from said beam forming means;

information means for introducing an information signal to be recorded on said information recording medium, the information signals including pulse signals;

signal modifying means having the information signal coupled thereto as an input for altering the time of occurrence of the trailing edges of pulses included in the information signal;

level modifying means for modifying the level of the information signal in accordance with the wavelength of the information signal;

means coupled to said beam forming means for applying the signal altered by said signal and level modifying means to said beam forming means as a modulating signal; and means operatively connected to said beam forming means for moving the beam relative to said information recording medium;

wherein variations in the exposure of said recording medium which would occur as a result of said predetermined beam cross section and energy profile are prevented.

6. Apparatus for recording information on an information recording medium using a beam, comprising:

beam forming means for forming a beam whose intensity depends upon the level of modulating signals applied thereto, the beam having a predetermined cross section and energy profile, said information recording medium being sensitive to the beam impinging thereon from said beam forming means;

information means for introducing an information signal to be recorded on said information recording medium;

signal processing means coupled to said information means for processing the information signal wherein variations in the exposure of said recording medium which would occur as a result of said predetermined beam cross section and energy profile are prevented by altering the information signal in accordance with the wavelength of pulse signals included in the information signal, and for providing a processed output signal, said signal processing means including means coupled to said information means for detecting a portion of the information signal which is shorter in wavelength than a predetermined value, means coupled to said detecting means for modifying the level of said portion of the information signal in response to the output of said detecting means, first modifying means for altering the time of occurrence of leading edges of pulses in the information signal in accordance with the wavelength of the information signal, and second modifying means for altering the time of occurrence of trailing edges of the pulses in accordance with the wavelength of the information signal; and means coupled to said beam forming means and said signal processing means for applying the processed signal to said beam forming means as a modulating signal.

* * * * *

UNITED STATES PATENT OFFICE
CERTIFICATE OF CORRECTION

Patent No. 4,243,849           Dated January 6, 1981

Inventor(s) TAKESHI GOSHIMA, ET AL.

It is certified that error appears in the above-identified patent and that said Letters Patent are hereby corrected as shown below:

Column 7, line 44, "E(x,ω) ∫ " should read --E(x,ω) = ∫ --;
line 50, "to" should read -- = --;

Column 9, line 41, "the consideration" should read --and consideration--;
line 51, "AC" should read --$\overline{AC}$--;

Column 10, line 44, "valve" should read --value--;
line 63, " >" should read -- < --;

Column 11, line 5, "this" should read --the--; " > " should read -- < --;

Column 12, line 14, "variable" should read --constant--;

Column 13, line 16, "Dmas61" should read --Dmax61--;
line 31, after "0" insert --and "1",--;

Column 14, line 9, insert --be-- before "increased";
line 10, "$\bar{x}_{65}$" should read --$x_{65}$,--;
line 21, "$\bar{x}_{65}$" should read --$x_{65}$,--;

Column 16, line 16, "Aω" should read --$A_\omega 1$--;
line 40, "procedure" should read --processor--;
line 65, "ω2" should read -- $-\omega_m^2$ --;

Column 17, line 1, "determined" should read --designated--;

Column 17, line 29, "desiraable" should read --desirable--;
line 41, "FIG.(d)" should read --FIG. 40(d);

UNITED STATES PATENT OFFICE
CERTIFICATE OF CORRECTION

Patent No. 4,243,949    Dated January 6, 1981

Inventor(s) TAKESHI GOSHIMA, ET AL.

It is certified that error appears in the above-identified patent and that said Letters Patent are hereby corrected as shown below:

Column 18, line 29, "circit" should read --circuit--;
line 50, "335" should read --355--;

Column 19, line 19, "input" should read --output--;
line 48, "$E_{10-4}$" should read --$E_{104}$--;

Column 20, line 24, "is at" should read --is set at--;
line 54, "$t_{102}$," (second occurrence) should read --$t_{102}$,--;
line 57, "corresponding" should read --correcting--;

Column 21, line 14, after "inverter" insert --361--;
line 52, "$\tau r_{10}$" should read --$\tau_{10}$--;

UNITED STATES PATENT OFFICE
CERTIFICATE OF CORRECTION

Patent No. 4,243,849　　　　　　　Dated January 6, 1981

Inventor(s) TAKESHI GOSHIMA, ET AL.

It is certified that error appears in the above-identified patent and that said Letters Patent are hereby corrected as shown below:

Column 22, line 54, "$\tau_{131}$" (second occurrence) should read --$\tau_{132}$--;

Column 23, line 35, "otherhand" should read --other hand--;

Column 24, lines 10, 11, Claim 1, "corresponding" should read --correspondingly--.

Column 25, lines 10, 11, Claim 5, "corresponding" should read --correspondingly--.

Signed and Sealed this

Sixteenth Day of August 1983

[SEAL]

Attest:

GERALD J. MOSSINGHOFF

Attesting Officer　　Commissioner of Patents and Trademarks